(12) United States Patent
Belov et al.

(10) Patent No.: US 12,445,437 B2
(45) Date of Patent: *Oct. 14, 2025

(54) SYSTEMS AND METHODS OF APPLICATION SINGLE SIGN ON

(71) Applicant: Apple Inc., Cupertino, CA (US)

(72) Inventors: Dmitry V. Belov, Santa Clara, CA (US); Brent A. Fulgham, San Jose, CA (US); Sudhakar N. Mambakkam, Saratoga, CA (US); Richard J. Mondello, Mountain View, CA (US); Kalyan C. Gopavarapu, Sunnyvale, CA (US); Edgar Tonatiuh Barragan Corte, Sunnyvale, CA (US); Libor Sykora, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,858

(22) Filed: Jan. 5, 2024

(65) Prior Publication Data

US 2024/0146724 A1    May 2, 2024

Related U.S. Application Data

(63) Continuation of application No. 18/153,118, filed on Jan. 11, 2023, now Pat. No. 11,895,111, which is a
(Continued)

(51) Int. Cl.
*H04L 9/40* (2022.01)
*H04L 41/22* (2022.01)
*H04L 67/02* (2022.01)

(52) U.S. Cl.
CPC .......... *H04L 63/0861* (2013.01); *H04L 41/22* (2013.01); *H04L 63/083* (2013.01); *H04L 63/20* (2013.01); *H04L 67/02* (2013.01)

(58) Field of Classification Search
None
See application file for complete search history.

(56) References Cited

U.S. PATENT DOCUMENTS

| 6,668,322 B1 | 12/2003 | Wood et al. |
| 7,188,358 B1 | 3/2007 | Hisada et al. |

(Continued)

FOREIGN PATENT DOCUMENTS

| CA | 2245293 A1 | 9/1999 |
| CN | 1864377 A | 11/2006 |

(Continued)

OTHER PUBLICATIONS

Notification to Grant Patent Right for Invention received for Chinese Patent Application No. 202080040650.2, mailed on Jun. 10, 2024, 8 pages (2 pages of English Translation and 6 pages of Original Document).

(Continued)

*Primary Examiner* — Quang N Nguyen
(74) *Attorney, Agent, or Firm* — Kilpatrick Townsend & Stockton LLP

(57) ABSTRACT

A method and apparatus of a device that authorizes a device for a service is described. In an exemplary embodiment, the device intercepts a request for a web page from a web browser executing on the device, wherein the request includes an indication associated with an authorization request for the service and the web page provides the service. In addition, the device presents an authorization user interface on the device. The device further performs a local authorization using a set of user credentials entered via the authorization user interface. The device additionally performs a server authorization with a server. Furthermore,
(Continued)

the device redirects the web browser to the requested web page, wherein the web browser is authorized for the service provided by the web page.

20 Claims, 15 Drawing Sheets

Related U.S. Application Data continuation of application No. 16/888,479, filed on May 29, 2020, now Pat. No. 11,582,229.

(60) Provisional application No. 62/856,059, filed on Jun. 1, 2019.

(56) References Cited

U.S. PATENT DOCUMENTS

| | | | |
|---|---|---|---|
| 7,345,671 B2 | 3/2008 | Robbin et al. | |
| 7,784,092 B2 | 8/2010 | Pearson et al. | |
| 8,006,098 B2 | 8/2011 | Aupperle et al. | |
| 8,014,756 B1 | 9/2011 | Henderson | |
| 8,689,001 B1 | 4/2014 | Satish et al. | |
| 8,806,196 B2 | 8/2014 | Metke et al. | |
| 8,996,857 B1 | 3/2015 | Akella et al. | |
| 9,130,921 B2* | 9/2015 | Boubez | H04L 63/08 |
| 9,202,218 B1 | 12/2015 | Crisman et al. | |
| 9,203,829 B1 | 12/2015 | Levine et al. | |
| 9,582,802 B2 | 2/2017 | Bachenheimer et al. | |
| 9,756,000 B1 | 9/2017 | Paulramachandran et al. | |
| 9,792,426 B1 | 10/2017 | Driscoll et al. | |
| 9,935,942 B2 | 4/2018 | Kim et al. | |
| 10,243,945 B1 | 3/2019 | Kruse et al. | |
| 10,671,688 B2 | 6/2020 | Nakashima | |
| 10,701,067 B1 | 6/2020 | Ziraknejad et al. | |
| 11,361,107 B2 | 6/2022 | Roundtree | |
| 11,601,419 B2 | 3/2023 | Ryu et al. | |
| 2001/0055388 A1 | 12/2001 | Kaliski | |
| 2004/0193915 A1 | 9/2004 | Smith et al. | |
| 2004/0205176 A1 | 10/2004 | Ting et al. | |
| 2004/0224638 A1 | 11/2004 | Fadell et al. | |
| 2005/0198173 A1 | 9/2005 | Evans | |
| 2005/0198537 A1 | 9/2005 | Rojewski | |
| 2006/0053296 A1 | 3/2006 | Busboom et al. | |
| 2006/0218025 A1 | 9/2006 | Miller et al. | |
| 2007/0011245 A1 | 1/2007 | Kawashima et al. | |
| 2007/0299920 A1 | 12/2007 | Crespo et al. | |
| 2008/0072301 A1 | 3/2008 | Chia et al. | |
| 2010/0043065 A1 | 2/2010 | Bray et al. | |
| 2010/0077469 A1 | 3/2010 | Furman et al. | |
| 2010/0257578 A1 | 10/2010 | Shukla et al. | |
| 2011/0010425 A1 | 1/2011 | Bernatz | |
| 2011/0010762 A1 | 1/2011 | Nijdam et al. | |
| 2011/0231502 A1 | 9/2011 | Umeshima et al. | |
| 2011/0246593 A1 | 10/2011 | Crespo et al. | |
| 2012/0102326 A1 | 4/2012 | Palekar | |
| 2012/0151210 A1 | 6/2012 | Perez | |
| 2013/0067568 A1 | 3/2013 | Obasanjo et al. | |
| 2013/0080775 A1 | 3/2013 | Liebmann et al. | |
| 2013/0198823 A1 | 8/2013 | Hitchcock et al. | |
| 2014/0046792 A1 | 2/2014 | Ganesan | |
| 2014/0059658 A1 | 2/2014 | Stecher | |
| 2014/0059693 A1 | 2/2014 | Stecher | |
| 2014/0189808 A1 | 7/2014 | Mahaffey et al. | |
| 2014/0189839 A1 | 7/2014 | Jezek | |
| 2014/0230027 A1 | 8/2014 | Cha et al. | |
| 2014/0236846 A1 | 8/2014 | Melika et al. | |
| 2014/0237553 A1 | 8/2014 | Feuer et al. | |
| 2014/0282919 A1 | 9/2014 | Mason | |
| 2014/0282980 A1 | 9/2014 | Kolluru et al. | |
| 2014/0298413 A1* | 10/2014 | Anderson | H04L 63/10 726/3 |
| 2014/0298432 A1 | 10/2014 | Brown | |
| 2014/0366154 A1 | 12/2014 | Van et al. | |
| 2015/0081552 A1 | 3/2015 | Stewart | |
| 2016/0142399 A1* | 5/2016 | Pace | G06F 21/41 726/4 |
| 2016/0234343 A1 | 8/2016 | Fausak et al. | |
| 2016/0359863 A1 | 12/2016 | Krstic et al. | |
| 2016/0366119 A1 | 12/2016 | Rykowski et al. | |
| 2016/0366122 A1* | 12/2016 | Rykowski | G06F 21/41 |
| 2016/0380957 A1 | 12/2016 | Gupta et al. | |
| 2017/0163636 A1 | 6/2017 | Nishida | |
| 2017/0339151 A1 | 11/2017 | Van et al. | |
| 2018/0063129 A1 | 3/2018 | Aigner et al. | |
| 2018/0091490 A1* | 3/2018 | Wang | H04L 63/0407 |
| 2018/0145968 A1 | 5/2018 | Rykowski et al. | |
| 2018/0152440 A1 | 5/2018 | Hande et al. | |
| 2018/0288030 A1 | 10/2018 | Witrisna et al. | |
| 2019/0058707 A1 | 2/2019 | Chung et al. | |
| 2019/0132280 A1* | 5/2019 | Meuninck | H04L 61/4511 |
| 2019/0132307 A1* | 5/2019 | Pitchaimani | A61C 9/0066 |
| 2019/0253251 A1 | 8/2019 | Kobayashi | |
| 2019/0297089 A1 | 9/2019 | Bryant | |
| 2020/0067907 A1 | 2/2020 | Avetisov et al. | |
| 2020/0137038 A1 | 4/2020 | Endler | |
| 2020/0137052 A1 | 4/2020 | Sunkavally et al. | |
| 2020/0153814 A1 | 5/2020 | Smolny et al. | |
| 2020/0358823 A1* | 11/2020 | McCarty | H04L 63/20 |
| 2020/0382455 A1 | 12/2020 | Fasoli et al. | |
| 2020/0382495 A1 | 12/2020 | Belov et al. | |
| 2021/0073359 A1 | 3/2021 | Boodaei et al. | |
| 2021/0194883 A1 | 6/2021 | Badhwar et al. | |
| 2021/0374226 A1 | 12/2021 | Mondello et al. | |

FOREIGN PATENT DOCUMENTS

| | | |
|---|---|---|
| CN | 102224493 A | 10/2011 |
| CN | 103918000 A | 7/2014 |
| EP | 2575315 A1 | 4/2013 |
| EP | 2756471 A1 | 7/2014 |
| GB | 2503704 A | 1/2014 |
| JP | 2002-281089 A | 9/2002 |
| JP | 2016-004406 A | 1/2016 |
| WO | 2013/038190 A1 | 3/2013 |
| WO | 2014/105263 A1 | 7/2014 |
| WO | 2020/039327 A1 | 2/2020 |

OTHER PUBLICATIONS

Non-Final Office Action received for U.S. Appl. No. 16/888,482, mailed on Apr. 11, 2024, 18 pages.

Notice of Allowance received for U.S. Appl. No. 16/888,461, mailed on Mar. 6, 2024, 5 pages.

Office Action received for Chinese Patent Application No. 202080040650.2, mailed on Apr. 18, 2024, 7 pages (4 pages of English Translation and 3 pages of Original Document).

Third Office Action received for Chinese Patent Application No. 202080040650.2, mailed on Jan. 15, 2024, 13 pages (6 pages of English Translation and 7 pages of Original Document).

Third-Party Submission under 37 CFR 1.290, date of submission in U.S. Appl. No. 16/888,479, filed May 4, 2021, 5 pages.

trashmail.com, "Features", Web Archive, Retrieved from <https://web.archive.org/web/20180904133419/https://trashmail.com/?cmd=features&lang=en>, Retrieved on May 4, 2021, 3 pages.

Trashmailservice, "TrashMail.net Tutorial Firefox Add-on Demo", Retrieved from <https://www.youtube.com/watch?v=NyTbXctxhRs>, Relevance: At 3:47, you can see that the "from" address and "To" addresses are embedded in the Reply-To address for reply processing, Relevant to claims: Claims 18-20, Nov. 22, 2009, 3 pages.

Virulhagiri Thirumavalavan, "Flowcharts", Retrieved from <https://www.dombox.org/flowcharts.pdf>, Retrieved on Feb. 17, 2019, Most relevant passage of drawings: Fig. 608 to Fig. 614, pp. 23 to 28, Relevant to claims: All claims, 32 pages.

Viruthagiri Thirumavalavan, "A Spamless Internet", Github Medium NANOG, Retrieved from <https://www.dombox.org/dombox.pdf>, Feb. 2019, pp. 1-299.

Viruthagiri Thirumavalavan, "Dombox—The Zero Spam Mail System", Web Archive, Retrieved from <https://web.archive.org/web/

(56) References Cited

OTHER PUBLICATIONS

20190217053110/https://medium.com/@Viruthagiri/dombox-the-zero-spam-mail-system-2b08ff7432cd>, Feb. 16, 2019, 52 pages.
Youtube, "Facebook added Face Recognition |Facial Biometric Data | Facebook feature 2018", 0:50-0:54, Available Online on <https://www.youtube.com/watch?v=i04vtKAdOrU>, Feb. 16, 2018, 3 pages.
Advisory Action received for U.S. Appl. No. 16/888,482, mailed on Nov. 16, 2023, 3 pages.
Apple, "Support Universal Links", 4 Pages, Retrieved Jul. 28, 2018, Web Archive, https://web.archive.org/web/20180728030641 /https://developer.apple.com/library/archive/documentation/General/Conceptual/ AppSearch/Universallinks.html.
Concise Description of Relevance under 35 USC 1.22(e) for U.S. Appl. No. 16/888,479, submitted Jun. 2, 2021, 10 pages.
Facebook, "Login for iOS", Web Archive, Retrieved from <https://web.archive.org/web/20131210005218/https://developers.facebook.com/docs/ios/login/>, Retrieved on Dec. 10, 2013, 5 pages.
Final Office Action received for U.S. Appl. No. 16/888,461, mailed on Dec. 29, 2021, 21 pages.
Final Office Action received for U.S. Appl. No. 16/888,461, mailed on Feb. 15, 2023, 24 pages.
Final Office Action received for U.S. Appl. No. 16/888,479, mailed on Apr. 29, 2022, 18 pages.
Final Office Action received for U.S. Appl. No. 16/888,482, mailed on Jul. 13, 2023, 17 pages.
Final Office Action received for U.S. Appl. No. 16/888,482, mailed on Jun. 20, 2022, 14 pages.
Gmail, "Automatically forward Gmail messages to another account", Web Archive, Retrieved from <https://web.archive.org/web/20190203105529/https://support.google.com/mail/answer/10957?hl=en>, Retrieved on Feb. 3, 2019, 3 pages.
Gmail, "Email receiving limits", Web Archive, Retrieved from <https://web.archive.org/web/20181119034429/https://support.google.com/a/answer/1366776?hl=en>, Retrieved on May 4, 2021, 2 pages.
International Preliminary Report on Patentability received for PCT Patent Application No. PCT/US2020/035557, mailed on Dec. 16, 2021, 12 pages.
International Preliminary Report on Patentability received for PCT Patent Application No. PCT/US2020/035593, mailed on Dec. 16, 2021, 8 pages.
International Search Report and Written Opinion received for PCT Patent Application No. PCT/US2020/035557, mailed on Nov. 2, 2020, 16 pages.
International Search Report and Written Opinion received for PCT Patent Application No. PCT/US2020/035593, mailed on Aug. 27, 2020, 9 pages.
Max Weinbach, "Android P adds new Biometrics API that supports iris, face, and fingerprint scanning", Web Archive, Retrieved from <https://web.archive.org/web/20181122134553/https://www.xda-developers.com/android-p-new-biometrics-api/>, Retrieved on Nov. 22, 2018, 8 pages.
Non-Final Office Action received for U.S. Appl. No. 16/888,461, mailed on Jun. 24, 2022, 21 pages.
Non-Final Office Action received for U.S. Appl. No. 16/888,461, mailed on Mar. 30, 2021, 20 pages.
Non-Final Office Action received for U.S. Appl. No. 16/888,461, mailed on Nov. 6, 2023, 12 pages.
Non-Final Office Action received for U.S. Appl. No. 16/888,479, mailed on Oct. 28, 2021, 17 pages.
Non-Final Office Action received for U.S. Appl. No. 16/888,482, mailed on Dec. 9, 2022, 15 pages.
Non-Final Office Action received for U.S. Appl. No. 16/888,482, mailed on Sep. 16, 2021, 13 pages.
Non-Final Office Action received for U.S. Appl. No. 17/303,291, mailed on Nov. 18, 2022, 8 pages.
Non-Final Office Action received for U.S. Appl. No. 18/153,118, mailed on Apr. 26, 2023, 17 pages.
Non-Final Office Action received for U.S. Appl. No. 18/153,118, mailed on Jul. 28, 2023, 13 pages.
Notice of Allowance received for U.S. Appl. No. 16/888,479, mailed on Aug. 30, 2022, 15 pages.
Notice of Allowance received for U.S. Appl. No. 16/888,479, mailed on Oct. 28, 2022, 16 pages.
Notice of Allowance received for U.S. Appl. No. 17/303,291, mailed on Aug. 2, 2023, 4 pages.
Notice of Allowance received for U.S. Appl. No. 17/303,291, mailed on Jul. 20, 2023, 9 pages.
Notice of Allowance received for U.S. Appl. No. 18/153,118, mailed on Nov. 22, 2023, 9 pages.
Observations by third parties received for European Patent Application No. 20746467.8, mailed on May 4, 2021, 15 pages.
Office Action received for Chinese Patent Application No. 202080040650.2, mailed on Nov. 1, 2022, 18 pages (9 pages of English Translation and 9 pages of Original Document).
PCT International Preliminary Report on Patentability for PCT/US2021/034463, mailed Dec. 15, 2022, 13 pages.
PCT International Search Report and Written Opinion of the International Searching Authority for PCT/US2021/034463, mailed Jul. 30, 2021, 19 pages.
PCT Invitation to Pay Additional Fees And, Where Applicable, Protest Fee, for PCT/US2020/035557, mailed Sep. 10, 2020, 13 pages.
PCT Third Party Observation for PCT/US2020/035557, date of submission Apr. 10, 2021, 6 pages.
PCT Third Party Observation for PCT/US2020/035593, dale of submission Mar. 6, 2021, 2 pages.
PCT Third Party Observation for PCT/US2020/035593, date of submission Mar. 6, 2021, 2 pages.
PCT Third Party Observation for PCT/US2020/035593, date of submission May 4, 2021, 4 pages.
Rick Fillion, "Developers: How we use SRP, and you can too", Web Archive, Retrieved from <https://web.archive.org/web/20190117084628/https://blog.1password.com/developers-how-we-use-srp-and-you-can-too/>, Feb. 14, 2018, 6 pages.
Second Office Action received for Chinese Patent Application No. 202080040650.2, mailed on Jun. 19, 2023, 8 pages (5 pages of English Translation and 3 pages of Original Document).
Shevek, "The Sender Rewriting Scheme", Web Archive, Retrieved from <https://web.archive.org/web/20190217091357/https://www.libsrs2.org/srs/srs.pdf>, Jun. 5, 2004, pp. 1-9.
Stackoverflow, "Native Facebook Login experience via browser", Web Archive, Retrieved from <https://web.archive.org/web/20150927002840/https://stackoverflow.com/questions/20943499/native-facebook-login-experience-via-browser>, Retrieved on Sep. 27, 2015, 2 pages.
Stackoverflow, "Use Facebook APP Authentication to automatically login to Mobile Website", Web Archive, Retrieved from <https://web.archive.org/web/20150325191219/http://stackoverflow.com/questions/7716883/use-facebook-app-authentication-to-automatically-login-to-mobile-website>, Retrieved on Mar. 25, 2015, 2 pages.
Third Party Submission—Concise Description of Relevance for 16888479, date of submission Apr. 27, 2021, 10 pages.
Third Party Submission under 37 CFR 1.290—Concise Description of Relevance, date of submission in U.S. Appl. No. 16/888,479, May 2021, 10 pages.
Third-Party Submission Under 37 CFR 1.290 received for U.S. Appl. No. 16/888,461, mailed on Apr. 8, 2021, 5 pages.
Third-Party Submission Under 37 CFR 1.290 received for U.S. Appl. No. 16/888,479, mailed on Jun. 2, 2021, 5 pages.
Third-Party Submission Under 37 CFR 1.290 received for U.S. Appl. No. 16/888,482, mailed on May 4, 2021, 2 pages.
Third-Party Submission under 37 CFR 1.290, Concise Description of Relevance, for U.S. Appl. No. 16/888,479, submitted Jun. 2, 2021, 10 pages.
Non-Final Office Action received for U.S. Appl. No. 16/888,461, mailed on Nov. 7, 2024, 32 pages.
Notice of Allowance received for U.S. Appl. No. 18/461,322, mailed on Jul. 1, 2024, 3 pages.
Notice of Allowance received for U.S. Appl. No. 18/461,322, mailed on May 9, 2024, 10 pages.

* cited by examiner

SYSTEMS AND METHODS OF APPLICATION SINGLE SIGN ON

This application is a continuation of co-pending U.S. application Ser. No. 18/153,118 filed Jan. 11, 2023, issued as U.S. Pat. No. 11,895,111 on Feb. 6, 2024, which is a continuation of U.S. application Ser. No. 16/888,479 filed May 29, 2020, issued as U.S. Pat. No. 11,582,229 on Feb. 14, 2023, which claims the benefit of and priority of U.S. Provisional Patent Application No. 62/856,059, filed on Jun. 1, 2019, which are incorporated herein by reference in their entireties to provide continuity of disclosure.

FIELD OF INVENTION

This invention relates generally to an application sign on and more particularly to an application single sign on.

BACKGROUND OF THE INVENTION

A single sign-on service is a service that allows a user to use a single set of credentials to sign-on to multiple services across one or more authorization domains. For example, a user could use a single username and password combination (or another set of user credentials) to sign-on for media streaming service from one company and a social media account from another company, even though these two companies are in different authorization domains. In this embodiment, having a single sign-on service for multiple services over multiple authorization domains allows a user to remember just a single set of credentials for a variety of services from a variety of sources. Typically, when a user wishes to sign-on to a first service (e.g., launching an application for the first time, re-logging into an application, accessing a service through a web interface, accessing a service through digital media player, and/or another scenario in which the user is presented with an interface to authenticate with the service), the user is presented a user interface that displays a native sign-on user interface for the application and a single sign-on user interface (e.g., "connect with XYZ").

A problem with single sign-on services is that the entity providing the single sign-on user service will share a user's private information with the individual service providers. Often, the sharing of private information is done without the user knowing about how this private information sharing works. For example, the user may unwittingly share, via the single sign-on service, how often the user is using one or more applications, the user's real name, the user's real email address, and/or other private information with the service provider that allows their service to be authorized through the single sign-on service.

SUMMARY OF THE DESCRIPTION

A method and apparatus of a device that authorizes a device for a service is described. In an exemplary embodiment, the device intercepts a request for a web page from a web browser executing on the device, wherein the request includes an indication associated with an authorization request for the service and the web page provides the service. In addition, the device presents an authorization user interface on the device. The device further performs a local authorization using a set of user credentials entered via the authorization user interface. The device additionally performs a server authorization with a server. Furthermore, the device redirects the web browser to the requested web page, wherein the web browser is authorized for the service provided by the web page.

A machine-readable medium having executable instructions to cause one or more processing units to perform a method to authorize a device for a service is described. In an exemplary embodiment, the machine-readable medium method intercepts a request for a web page from a web browser executing on the machine-readable medium method, wherein the request includes an indication associated with an authorization request for the service and the web page provides the service. In addition, the machine-readable medium method presents an authorization user interface on the machine-readable medium method. The machine-readable medium method further performs a local authorization using a set of user credentials entered via the authorization user interface. The machine-readable medium method additionally performs a server authorization with a server. Furthermore, the machine-readable medium method redirects the web browser to the requested web page, wherein the web browser is authorized for the service provided by the web page.

In a further embodiment, the web request is a Hypertext Transfer Protocol request. In addition, the machine-readable medium method performs a server authorization by sending a server authorization request to a server and receiving an authorization response from the server. Furthermore, the server authorization request is a secure remote protocol request and the authorization user interface is presented using a process that is different than a process executing the web browser.

In another embodiment, the machine-readable medium method intercepts the web page request by receiving a location for the web page, determining that an authorization can be performed for the web page, and loading an authorization extension to handle an authorization for the web page. In addition, the authorization user interface includes a component for receiving the user credentials from the user, where the user credentials are selected from the group consisting of biometric user credentials or a username and password.

A method to authorize a device for a service is described. In an exemplary embodiment, the method intercepts a request for a web page from a web browser executing on the method, wherein the request includes an indication associated with an authorization request for the service and the web page provides the service. In addition, the method presents an authorization user interface on the machine-readable medium method. The method further performs a local authorization using a set of user credentials entered via the authorization user interface. The additionally performs a server authorization with a server. Furthermore, the method redirects the web browser to the requested web page, wherein the web browser is authorized for the service provided by the web page.

In a further embodiment, a method and apparatus of a device that authorizes a device for a service provided by an application is described. In an exemplary embodiment, the device detects an authorization request by an application executing on a device for the service provided by the application. In addition, the device determines an identify provider associated with the application. The device further loads an authorization extension associated with the determined identify provider. The device additionally presents an authorization user interface corresponding to the authorization extension and receives a local authorization for the device based on at least data received by the authorization user interface. Furthermore, the device negotiates an authorization token with a server and returns the authorization token to the application, where the authorization token is used by the application to authorize the service provided by the application.

In another embodiment, a machine-readable medium having executable instructions to cause one or more processing units to perform a method to authorize a device for a service provided by an application is described. In an exemplary embodiment, the machine-readable medium method detects an authorization request by an application executing on a machine-readable medium method for the service provided by the application. In addition, the machine-readable medium method determines an identify provider associated with the application. The machine-readable medium method further loads an authorization extension associated with the determined identify provider. The machine-readable medium method additionally presents an authorization user interface corresponding to the authorization extension and receives a local authorization for the machine-readable medium method based on at least data received by the authorization user interface. Furthermore, the machine-readable medium method negotiates an authorization token with a server and returns the authorization token to the application, where the authorization token is used by the application to authorize the service provided by the application.

In a further embodiment, the machine-readable medium method detects the authorization request by receiving a web page request, wherein the web page request includes an indication associated with an authorization request for the service and determining that the application can be authorized for the service based on at least the indication. In addition, the authorization user interface is presented using a process that is different than a process executing the application. Furthermore, the machine-readable medium method detects the authorization request by receiving a request from the application to authorize the service.

In another embodiment, the machine-readable medium method determines the identity provider by requesting a list of identity providers from a server, receiving the list of identity providers from the server, and selecting an identity provider from the list of identity providers. In addition, the server is a mobile device management server, the identity provider is service that can verify an identity, and the authorization extension is a user interface component that is used to enter a set of user credentials for the local authorization. Furthermore, the authorization user interface includes a component for receiving the user credentials from the user, where the user credentials are selected from the group consisting of biometric user credentials or a username and password.

In another embodiment, a method to authorize a device for a service provided by an application is described. In an exemplary embodiment, the method detects an authorization request by an application executing on a method for the service provided by the application. In addition, the determines an identify provider associated with the application. The method further loads an authorization extension associated with the determined identify provider. The method additionally presents an authorization user interface corresponding to the authorization extension and receives a local authorization for the method based on at least data received by the authorization user interface. Furthermore, the method negotiates an authorization token with a server and returns the authorization token to the application, where the authorization token is used by the application to authorize the service provided by the application.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 14 is a flow diagram of one embodiment of a process to handle a user sign on.

DETAILED DESCRIPTION

Figure 1:
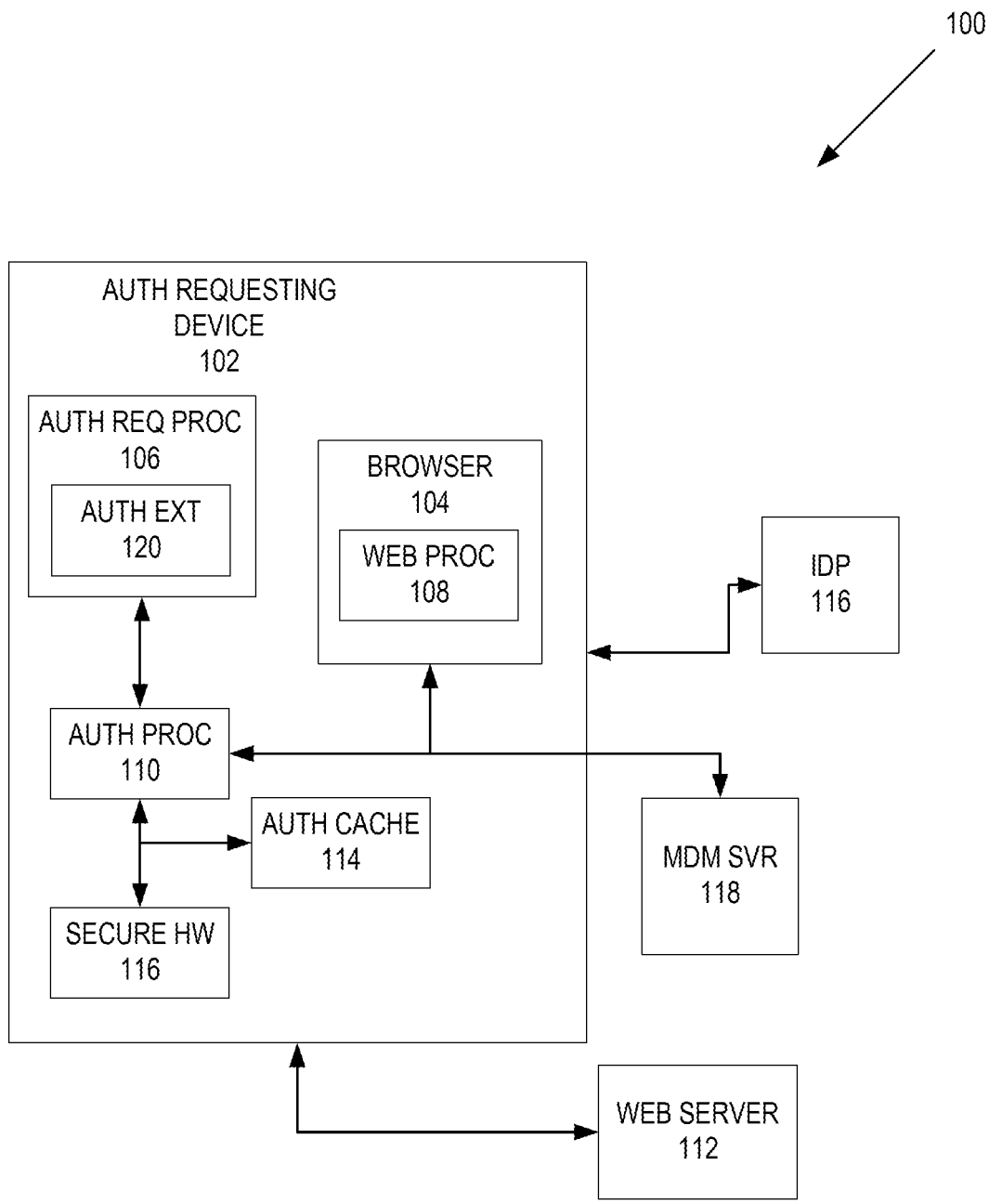
FIG. 1 is an illustration of one embodiment of a system that handles an application single sign on via a browser.

A method and apparatus of a device that authorizes a device for a service is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that authorizes a device for a service is described. In one embodiment, a single sign-on service is a service that allows a user to use a single set of credentials to sign-on to multiple services across one or more authorization domains. For example, a user could use a single username and password combination (or another set of user credentials) to sign-on for media streaming service from one company and a social media account from another company, even though these two companies are in different authorization domains. In this embodiment, having a single sign-on service for multiple services over multiple authorization domains allows a user to remember just a single set of credentials for a variety of services from a variety of sources. Typically, when a user wishes to sign-on first service (e.g., launching an application for the first time, re-logging into an application, accessing a service through a web interface, accessing a service through digital media player, and/or another scenario in which the user is presented with an interface to authenticate with the service), the user is presented a user interface that displays a native sign-on user interface for the application and a single sign-on user interface (e.g., "connect with XYZ").

A problem with single sign-on services is that the entity providing the single sign-on user service will share a user's private information with the individual service providers. Often, the sharing of private information is done without the user knowing about how this private information sharing works. For example, the user may unwittingly share, via the single sign-on service, how often the user is using one or more applications, the user's real name, the user's real email address, and/or other private information with the service provider that allows their service to be authorized through the single sign-on service.

In one embodiment, a new single sign-on service allows the user to sign-on with different services across different authorization domains using a single set of credentials and without sharing the private information unless the user explicitly authorizes this private information sharing. In this embodiment, for the new single sign-on service, the user is associated with a user identifier that can be used to authenticate a user and authorize the user and/or the user's devices to use one or more services across multiple authorization domains. In addition, the user can control what information is shared with these service providers. In one embodiment, each of the user's set of devices (e.g., smartphone, tablet, laptop, digital media player, and/or another device) is a trusted device. In a further embodiment, the user's device is trusted because each of the devices has been signed into using an elevated trusted mechanism, such as two factor authentication. For example and in one embodiment, a trusted device is a device that the authorization domain knows is a user device for a user and that can be used to verify a user's identity.

In one embodiment, an authorization domain is a collection of one or more services and/or authorization mechanism(s) that allow a user to be authorized for the one or more of the services provided by authorization domain using the authorization mechanism(s) of that authorization domain. In addition, one or more user devices associated with a user can be authorized for the one or more authorization services using these authorization mechanism(s). In one embodiment, each user is associated with a unique identifier (e.g., the user identifier) that can be used across the authorization domain. For example and in one embodiment, an authorization domain can be used by a user and/or the user's device(s) to purchase applications, purchase and/or stream media, store content in a cloud storage, access social media, and/or other types of services.

In one embodiment, the new single sign-on service provides a single sign-on for multiple services provided by a native application on the user's device or through a web browser across multiple authorization domains. This allows a user to sign-onto different applications and/or services with the user's identifier without exposing the user identifier (and/or other private information) to the developers or providers of the different applications and/or services.

In addition, the new single sign-on service provides for a proximity single sign-on on a first device, where a second user device allows a user to enter a set of credentials identifying the user so as to authorize a service on that first device. An example of this single sign-on service is illustrated in U.S. patent application No. 16,888,482, entitled "SYSTEMS AND METHODS FOR PROXIMITY SINGLE SIGN ON", filed on May 29, 2020, which is incorporated herein by reference.

Furthermore, the new single sign-on service can protect a user's real email address by providing an anonymous email relay. This anonymous email relay is used to hide a user's real email address between the user and one of the service providers (e.g., a developer of an application that the user signed on to using the new single sign-on service). The single sign-on service, in one embodiment, allows a user to remember only the user identifier across many different applications and the user can get email from a third party developer without exposing the user's identifier info through the email account set up for the user and that developer.

Moreover, the new single sign-on service provides a real user indicator to the service providers using a privacy preserving machine learning risk assessment system that allows that service provider to forgo using other mechanisms for indicating a real user is using their service (e.g., allowing the service provider to forgo using an extra user verification step such as a completely automated public Turing test to tell computers and humans apart (CAPTCHA)

mechanism). An example of an anonymous email relay is illustrated in U.S. patent application Ser. No. 16/888,461, entitled "SYSTEMS AND METHODS OF AN ANONYMOUS EMAIL RELAY", filed on May 29, 2020, which is incorporated herein by reference.

In addition, the new single sign-on service allows a user to use a user identifier associated with one authorization domain for signing on with applications and/or services of other authorization domains, where the user identifier and/or the user device are not part of the other authorization domains. In one embodiment, the user can sign-on to one or more applications that are part of authorization domains $A_1, \ldots, A_n$ using the user identifier that is part authorization domain B. This sign-on service enables the use of the applications on one or more of the user's devices, without revealing the user identifier or other private information to the developers or providers of those applications. In addition, the user identifier can be used for signing onto one or more applications that are part of the authorization domain B.

FIG. 1 is an illustration of one embodiment of a system 100 that handles an application single sign on via a browser. In FIG. 1, the system 100 includes an authorization requesting device 102 that is coupled to a web server 112, an identity provider 116, and a mobility device management (MDM) server 118. In one embodiment, the authorization requesting device 102 is any type of device that can execute an application (e.g., smartphone, laptop, personal computer, server, tablet, wearable, vehicle component, and/or any type of device that can process instructions of an application). Furthermore, in one embodiment, the web server 112 is a device that can receive a request for data (web page, document, video, image, audio, object, and/or any other type of data) and return this data to a requesting device. In addition, the identity provider is a provider that can verify an identity of a user.

In one embodiment, the authorization requesting device 102 includes a browser 104 that is coupled to an authorization request process 106 and authorization process 110. In one embodiment, the authorization request process 106 handles a sign-on request for the browser 104. In addition, the authorization process 110 is used to handle authorization requests for the browser 104 and detects and forwards authorization requests to the authorization requesting process 106. In addition, the browser 104 includes a web process 108 that sends web request and receives the response to the web request. In addition, the web process 108 processes the received data and renders this data for display.

In one embodiment, the MDM server is a server that executes a MDM service, where the MDM service is a type of security service used by an information technology department to monitor, manage, and secure employees' mobile devices that are deployed across multiple mobile service providers and across multiple mobile operating systems being used in the organization. In one embodiment, the MDM server 118 includes a list of identity providers, where the device can choose one of the identity providers for use with the authorization process.

In a further embodiment, the web process 108 sends a web request to the web server 112. The web process 108 checks to an authorization cache 114 on the device 102 to determine if the web request is authorized on this or another device or if the web request needs to be authorized at all. In one embodiment, the authorization cache 114 includes information that allows the authorization process 110 to check if the web request needs authorization. In this embodiment, the authorization cache 114 can include a list of domains that require authorizations. Furthermore, the authorization cache 114 can include one or more authorization tokens for domains, Uniform Resource Identifiers (URI), and/or Uniform Resource Locators (URLs) that have been previously been authorized. Thus, the authorization process 110 can check to see if the URL needs or have been previously been authorized. In addition, because the authorization cache 114 is on-device, these checks can be done on-device, so that this check is not done with a server. In one embodiment, this can keep these authorization checks private as remote authorization checks are not needed. In a further embodiment, the authorization cache 114 is updated on a periodic basis (e.g., every 24 hours). In this embodiment, the authorization cache 114 is updated with the authorization domain information and/or the authorization tokens associated with the user. In one embodiment, a user may perform an authorization on a different device and this authorization (e.g., by pushing out authorization tokens) is propagated to the user's other device(s). In one embodiment, by using an authorization cache 114 that is local to authorization requesting device 102, which websites and/or applications a user browses to is kept local to the device, because the checks are done locally and not on a remote server.

If the URL for the web request needs authorization, the web process 108 sends a request to the authorization process 110 to perform an authorization request for the URL. In turn, the authorization process 110 sends a request to the authorization request process 106 to load the authorization extensions 120 for this URL. In one embodiment, an authorization extension is an extension that includes an authorization user interface component and/or a resource to communicate with an identity provider associated with the authorization extension. In one embodiment, the URL is associated with a particular identity provider, such as the identity provider 116. For example and in one embodiment, if a URL is for a streaming media service, the corresponding identity provider can be one that supports this streaming media service. The identity provider can be one that verifies an identity for a wide variety services and/or URLs (e.g., a large media company, technology provider, etc.) or a specialized identity provider that verifies identities for a narrow group of URLs and/or services (e.g., a corporation, government, educational organization, etc.). In response, the authorization process 110 receives the authorization extensions and uses these extensions to load an authorization user interface on the device 102. In one embodiment, the authorization user interface is handled by the authorization process 110 and is not part of the process for the browser 104. In one embodiment, the authorization user interface is laid over the browser user interface. One embodiment of the authorization user interface is discussed in FIGS. 4A-D below In one embodiment, the authorization user interface requests the user to sign-on for the requested URL. In response to the authorization user interface being presented on the authorization process 110, the user elects the single sign on and enters the user credentials. With the received user credentials, the authorization process 110 can perform a local authentication using the authentication components that are part of the authorization process 110 and the secure hardware 116. For example and in one embodiment, the authorization process 110 sensors capture biometric data and performs a local authentication using the sensor data in the secure hardware 116. For example and in one embodiment, a biometric sensor is used for facial recognition to gather data for a comparison with a template in secure hardware. In one embodiment, by performing the local authentication, the authorization process 110 is determining that the user interacting with the authorization process 110 is known to the authorization requesting device 102. In one embodiment, the authorization requesting device 102 does not require a two-factor authentication because the authorization requesting device 102 is a trusted device with a valid access continuation parameter.

If the authorization process 110 is successful with the local authentication, the authorization process 110 sends a server authorization request to the identity provider 116. In one embodiment, the server authorization is used to authenticate the user and to authorize the device 102 for the requested URL. In this embodiment, the authorization process 110 sends a secure remote protocol (SRP) request to the identity provider 116 with the access continuation parameter. In one embodiment, the authorization requesting device 102 is trusted based on a two-factor authentication for the device. As a result of the two-factor authentication, the authorization process 110 receives an access continuation parameter, which can be used in the server authorization request to the identify provider 116. In one embodiment, the access continuation parameter allows the authorization requesting device 102 to access an account associated with the user without having the authorization requesting device 102 provide the user's set of credentials. In one embodiment, an access continuation parameter is described in U.S. Patent Publication No. 2016/0359863, entitled "Account Access Recovery System, Method and Apparatus," filed Sep. 30, 2015, which is incorporated by reference. In response to receiving the SRP request, the identity provider 116 authenticates the user using the received credentials and receives an authorization response includes an authorization code and a token. In some embodiments, the identity provider 116 may provide an attestation that the authorization requesting device 102 is an authorization requesting device 110 from a particular manufacturer with particular security hardware present on the device (e.g., secure hardware, biometric authentication hardware/sensors) that may be provided to the application.

In a further embodiment, the authorization process 110 returns the authorization response to the authorization request process 106. The authorization request process 106 redirects the web process 108 to load the third party web site of the web server 112. The web process 108 loads the redirect Uniform Resource Identifier (URI) with the tokens used for the authorization of the URI.

Figure 2:
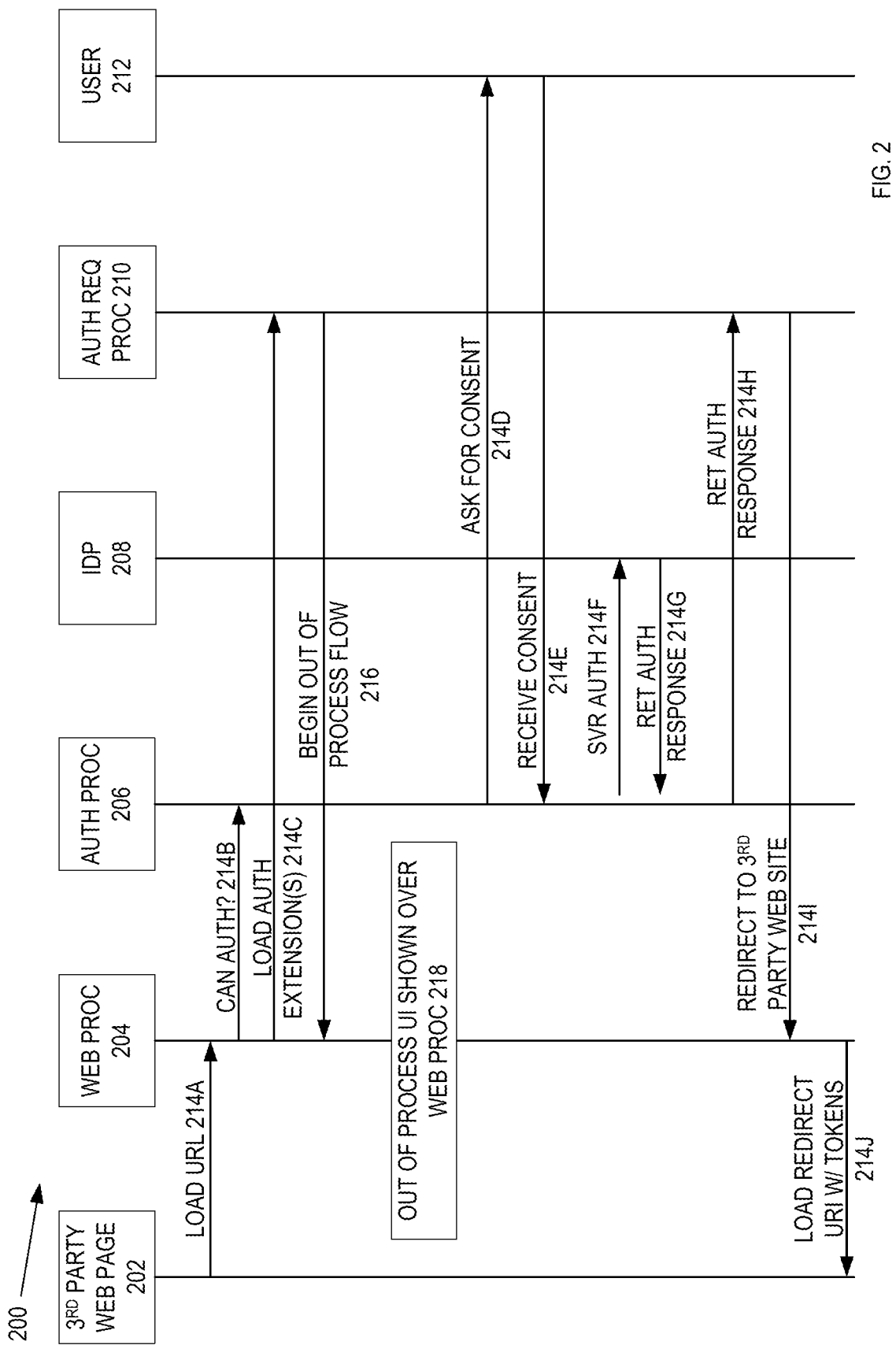
FIG. 2 is an illustration of one embodiment of a flow for an application single sign on via a browser.

FIG. 2 is an illustration of one embodiment of a flow 200 for an application single sign on via a browser. In FIG. 2, the flow 200 begins by a web process 204 attempting to load (214A) a third party URL 202. In one embodiment, the URL is selected by a user via a browser. In addition, the authorization process 206 checks the URL to determine if an authorization is needed (214B) to load the third party URL. In one embodiment, the authorization process 206 determines whether the third party web site needs authorization by using a cache that on the device as described in FIG. 1 above. If the authorization process 206 detects that the third party URL is part of one of the domains needing authorization, the web process 204 sends a request to the authorization request process 210 to load the corresponding authorization extensions (214C). In one embodiment, the web process 204 loads the authorization extensions as described in FIG. 1 above.

After the loading of the authorization extensions, the flow 200 begins the out of process flow 216. In one embodiment, the authorization consent is an out of process flow, where these actions (214D-214I) are performed by a process that is a different process than the process for the web process 204 or a child of the web process 204. In response to the loading of the authorization extensions, the authorization process 206 asks for an authorization consent (214D) to the user of the device. In one embodiment, the authorization process 206 asks for the authorization consent by presenting an authorization user interface on the device. In response, the authorization process 206 receives user consent (214E) by the user 202 entering the user credentials via the authorization user interface, where the user credentials can be a face identifier, touch identifier, pincode, and/or another type of user credential. In one embodiment, the authorization process 206 presents the authorization user interface and receives the user consent as described in FIG. 1 above. In this embodiment, by asking for and receiving consent by the user, the authorization process 206 is performing a local authentication to authenticate the user as part of the authorization for the third party web page 202.

In a further embodiment, with the local authentication performed by the authorization process 206, the authorization process 206 sends a server authorization request (214F) to the identity provider 208. In one embodiment, the server authorization request includes the access continuation parameter and the URL. In this embodiment, the server authorization request is used to check that the access continuation parameter is still valid, to generate a token that is used by the website for authorization, and that the third party web site is allowed for this operation (e.g. associated with a valid registered developer for this website). If the authorization is successful, the identity provider 208 returns an authorization response (214G) to the authorization process 206. In one embodiment, the authorization response includes an access continuation parameter and an identity token. In one embodiment, the identity provider 208 returns an authorization response (214H) to the authorization request process 210 as described in FIG. 1 above. The authorization endorsing process 210 redirects the web process 204 to the third party site (214J). In turn, the web process 204 loads the redirect URI with tokens as described in FIG. 1, where the sign-on flow is complete.

In one embodiment, the authorization response includes an authorization code and a token. In one embodiment, the authorization code and token can be associated with the an anonymous user identifier as described in U.S. patent application Ser. No. 16/888,461, entitled "SYSTEMS AND METHODS OF AN ANONYMOUS EMAIL RELAY", filed on May 29, 2020, which is incorporated by reference.

Figure 3:
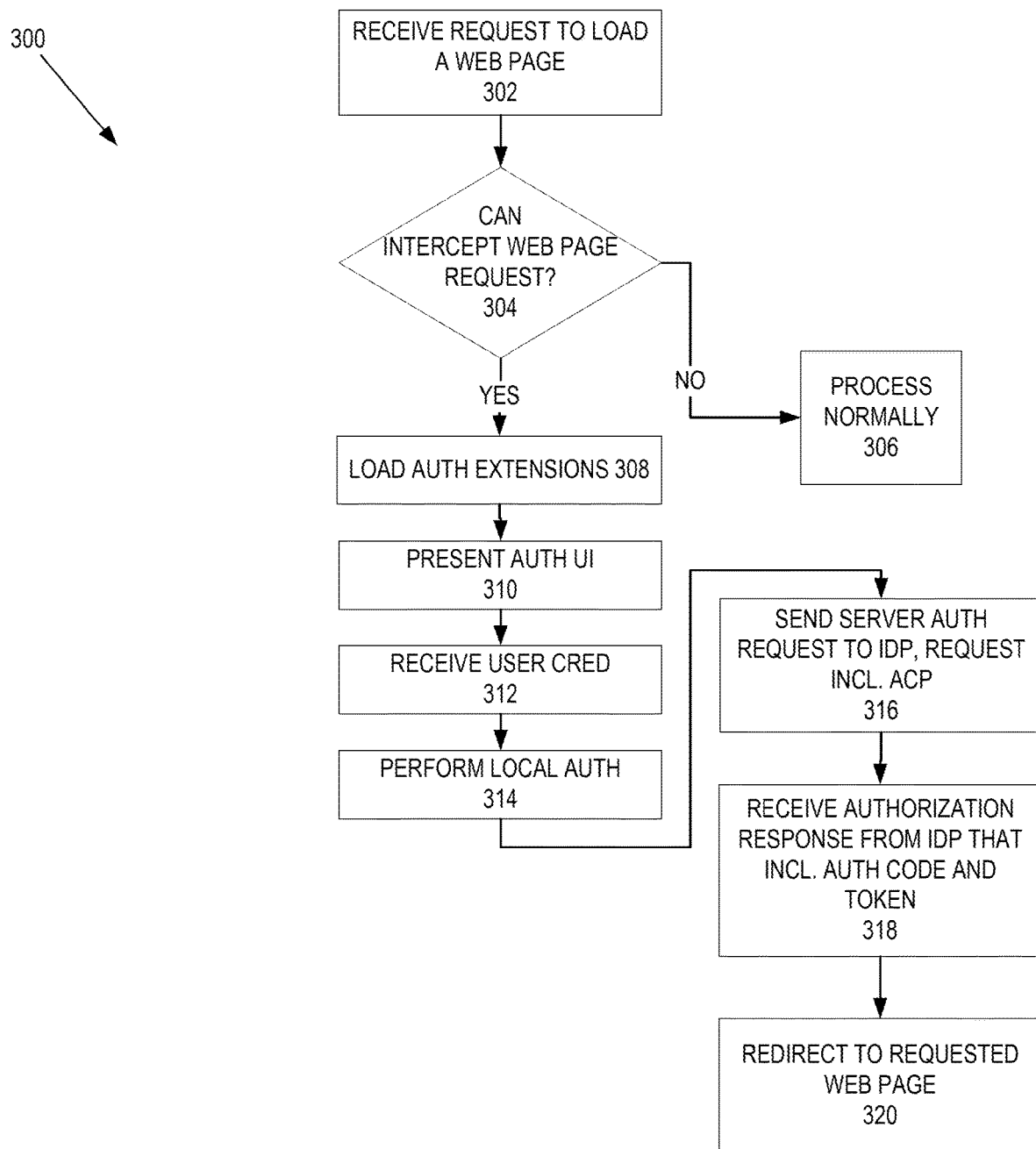
FIG. 3 is an illustration of one embodiment of a process to perform an application sign on via a browser.

FIG. 3 is an illustration of one embodiment of a process 300 to perform an application sign on via a browser. In one embodiment, a device performs an application sign on via a browser, such as the authorization request device 102 as described in FIG. 1 above. In FIG. 3, process 300 begins by receiving a request to load a web page at block 302. In one embodiment, the web page request is received via the browser. At block 304, process 300 determines if the process 300 can intercept the web page request for authorization. In one embodiment, process 300 determines if process 300 can intercept the web page request by comparing the URL of the web page request with a cache of known domains, URIs, and/or URLs that require an authorization as described in FIG. 1 above. If the web page request does not need an authorization, execution proceeds to block 306 where process 300 processes the web page normally.

If the requested web page does require authorization, process 300 loads the authorization extensions at block 308. In one embodiment, process 300 sends a request to load the authorization extensions for this URL, receives the authorization extensions, and uses these extensions to load an authorization user interface on the device. With the authorization extensions loaded, at block 310, process 300 presents the authorization user interface to the user. In one embodiment, process 300 presents the authorization user interface as described in FIG. 1 above. Process 300 receives the user credentials, where the user credentials can be a face identifier, touch identifier, pincode, and/or another type of user credential, at block 312. With the user credentials, at block 314, process 300 performs a local authentication. In one embodiment, process 300 performs the local authentication using the authentication components that are part of the authorization process 110 and the secure hardware 116 of the authorization requesting device 102 as described in FIG. 1 above. If the local authentication is successful, process 300 sends a server authorization request to an identity provider at block 316. In one embodiment, the server authorization request includes the access continuation parameter. In this embodiment, the server authorization request is used to check that the access continuation parameter is still valid, to generate a token that is used by the website for authorization, and that the third party web site is allowed for this operation (e.g. associated with a valid registered developer for this website). In one embodiment, process 300 sends a SRP request, where this request is used to identify the user and device that sent the server request to the identity provider and to authorize the application for the user. For example and in one embodiment, process sends the server authorization request as described in FIG. 1 above.

Process 300 receives an authorization response from the identity provider at block 318. In one embodiment, the authorization response indicates whether the authorization for the application is successful or not. For example and in one embodiment, process 300 receives the authorization response as described in FIG. 1 above. Process 300 returns redirects the web process to the URI at block 320. In one embodiment, process 300 redirects the web process as described in FIG. 1 above. In one embodiment, this sequence may establish the anonymous user identifier for use with the web site or domain associated with the web site. For a subsequent request, the anonymous identity token and authorization code are stored in an application authorization cache on the authorization requesting device and the single sign on (or another type of sign on for the application) is not needed until the user signs out of the application.

Figure 4A:
FIGS. 4A-D are illustrations of embodiments of a user interface for an application single sign on via a browser.
Figure 4B:
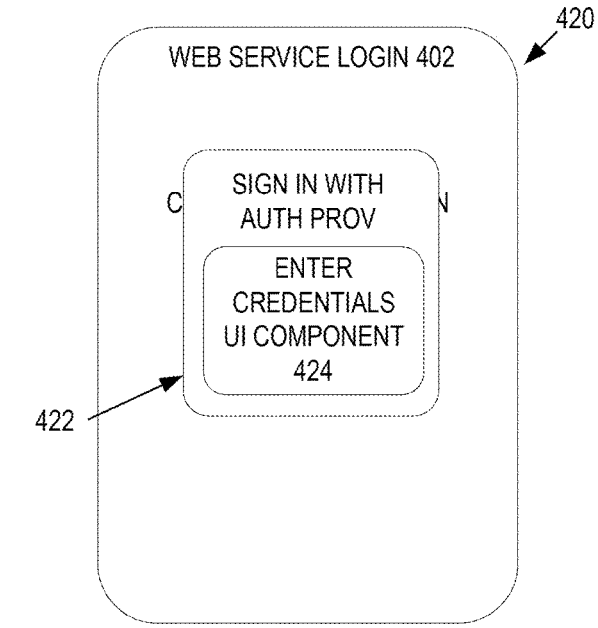
Figure 4C:
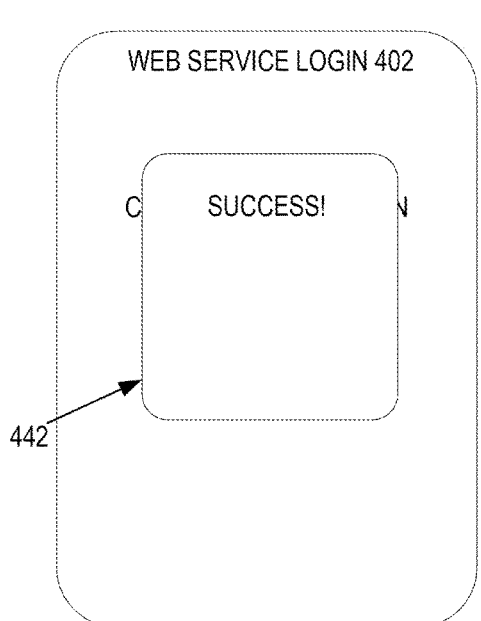
Figure 4D:
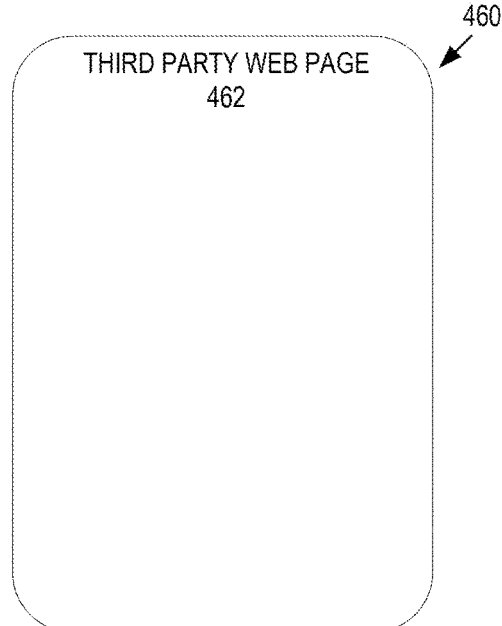

FIGS. 4A-D are illustrations of embodiments of a user interface for an application single sign on via a browser. In FIG. 4A, a browser 400 presents a web service login 402, which includes a hyperlink that indicates to click here to sign in. If a user clicks on this link 404, the device intercepts the request and presents an intercepted user interface 420 as illustrated in FIG. 4B. In FIG. 4B, the browser 420 has the overlaid authorization user interface 422 overlaid on the browser 420, where the overlaid authorization user interface 422 includes text that states "SIGN IN WITH AUTH PROV" and includes a user interface component that allows the user to enter their user credentials 424. If their user's entered credentials are successful for authorization, a message indicating success may be presented, as illustrated in FIG. 4C. In FIG. 4C, a "SUCCESS" message 442 is presented on the user interface 440. With the successful authorization, the browser 460 is redirected to the third party web page 462.

Figure 5:
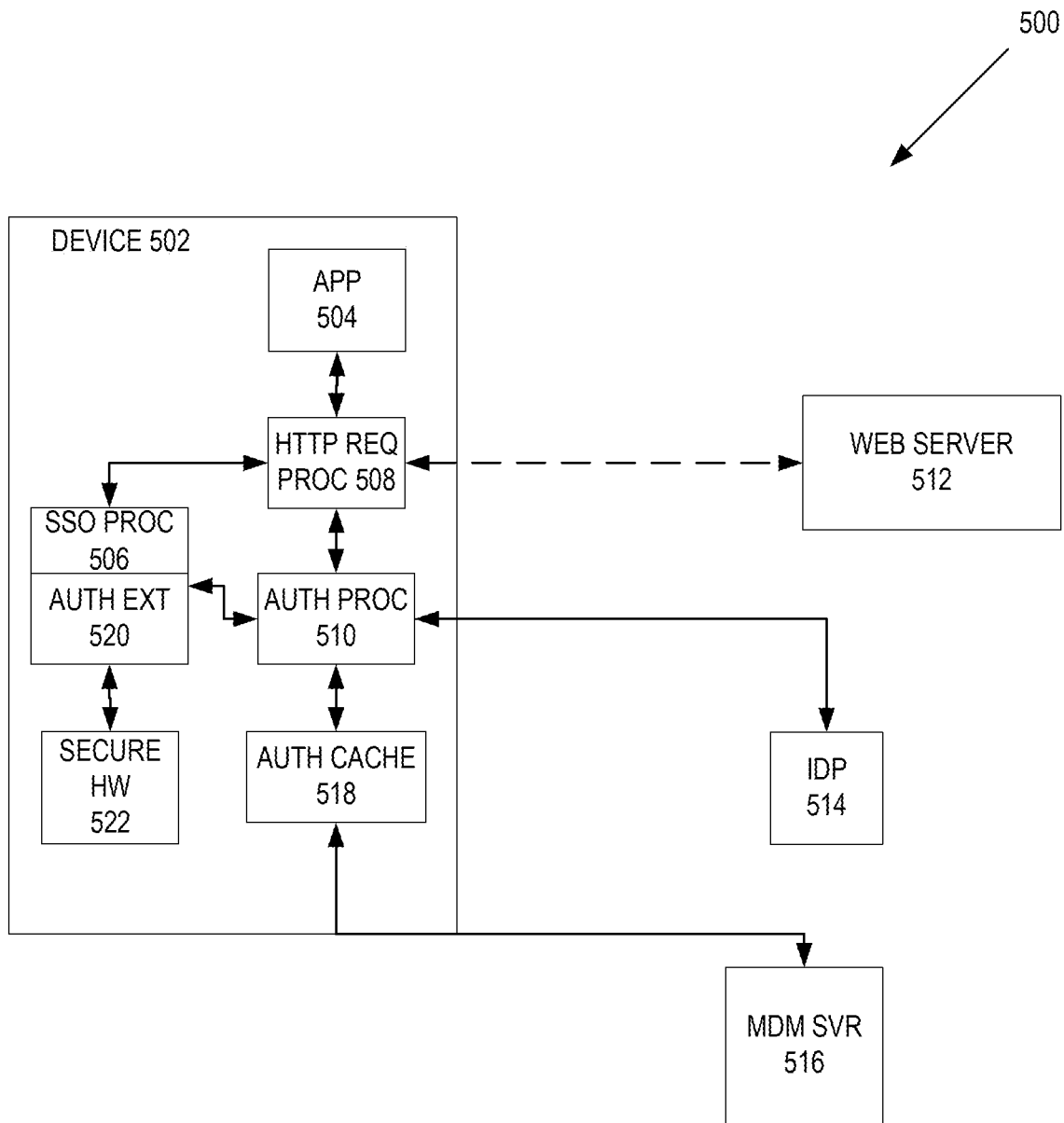
FIG. 5 is an illustration of one embodiment of a system that handles an application single sign for an application using an interception of an authorization request.

In FIGS. 1-4D, authorization is being handled for a browser, where a web request is intercepted and the authorization is provided using a process that is outside of the browser process. In another embodiment, the device can intercept a web request from a native application and perform an out of process authorization process. FIG. 5 is an illustration of one embodiment of a system 500 that handles an application single sign for an application using an interception of an authorization request. In FIG. 5, a device 502 includes an application 504 that is coupled to an identity provider 514 and a mobility device management (MDM) server 516. In one embodiment, the device 502 is a device that executes an application, such as the device 102 as described in FIG. 1. In addition, the identity provider 514 is the identity provider 116 as described in FIG. 1 above. In one embodiment, the MDM server is a server that executes a MDM service, where the MDM service is a type of security service used by an information technology department to monitor, manage, and secure employees' mobile devices that are deployed across multiple mobile service providers and across multiple mobile operating systems being used in the organization. In one embodiment, the MDM server 516 includes a list of identity providers, where the device can choose one of the identity providers for use with the authorization process.

In one embodiment, the device 502 includes an application 504 that is coupled to a hypertext transfer protocol (HTTP) request process 508, which is in turn coupled to an authorization process 510 and single sign-on (SSO) process 506. In one embodiment, the application 504 is software, that when executed by the device 502, provides a function. Furthermore, the HTTP request process 508 is a process that is used to send and receive HTTP requests for the application 504, in particular used to send authorization requests via the HTTP protocol. The HTTP request process 508 uses the authorization process 510 for the authorization checks. In addition, the authorization process 510 is coupled to the SSO process 506. In one embodiment, the authorization process 510 to perform an authorization request for the HTTP request process 508. In one embodiment, the application 504 sends a request for authorization via an HTTP request.

In a further embodiment, the application 504 sends an authorization request to the HTTP request process 508. The HTTP request process 508 checks an authorization cache 518 on the device 502 to determine if the authorization request needs to be handled or if the authorization has already been granted. In this embodiment, the authorization cache 518 includes information regarding which domain need authorization and/or if the application has been authorized previously. Furthermore, the authorization cache 518 can include one or more authorization tokens for domains, Uniform Resource Identifiers (URI), and/or Uniform Resource Locators (URLs) that have been previously been authorized. In one embodiment, by using an authorization cache 518 that is local to device 502, which applications a user launches or uses to is kept local to the device, because these checks are done locally and not on a remote server.

If the HTTP request process 508 determines that the authorization request needs authorization, the HTTP request process 508 sends a request to the authorization process 510 to perform an authorization request. In turn, the authorization process 510 sends a request to the SSO process 506 to load the authorization extensions 520 for this application 504. In one embodiment, the application 504 is associated with a particular identity provider, such as the identity provider 514. For example and in one embodiment, if an application is for a streaming media service, the corresponding identity provider can be one that supports this streaming media service. The identity provider can be one that verifies an identity for a wide variety services and/or applications (e.g., a large media company, technology provider, etc.) or a specialized identity provider that verifies identities for a narrow group of applications and/or services (e.g., a corporation, government, educational organization, etc.). In response, the authorization process 510 receives the authorization extensions and uses these extensions to load an authorization user interface on the device 502. In one embodiment, the authorization user interface is handled by the authorization process 510 and is not part of the process for the application 504. In one embodiment, the authorization user interface is laid over the application user interface. One embodiment of the authorization user interface is discussed in FIGS. 8A-D below.

In one embodiment, the authorization user interface requests the user to sign-on for the application. In response to the authorization user interface being presented on the authorization process 510, the user enters the credentials. With the received user credentials, the authorization process 510 can perform a local authentication using the authentication components that are part of the authorization process 510 and the secure hardware 522. In one embodiment, by performing the local authentication, the authorization process 510 is determining that the user interacting with the authorization process 510 is known to the device 502. In one embodiment, the device 502 does not require a two-factor authentication because the device 502 is a trusted device with a valid access continuation parameter.

If the authorization process 510 is successful with the local authentication, the authorization process 510 sends a server authorization request to the identity provider 514. In one embodiment, the server authorization is used to authenticate the user and to authorize the device 502 for the requested URL. In this embodiment, the authorization process 510 sends a secure remote protocol (SRP) request to the identity provider 514 with the user credentials. In response to receiving the SRP request, the identity provider 514 authenticates the user using the received credentials and receives an authorization response includes an authorization code and a token. In one embodiment, the device 502 is trusted based on a two-factor authentication for the device. As a result of the two-factor authentication, the device 502 receives an access continuation parameter, which can be used in the SRP request to the identify provider 514. In one embodiment, the access continuation parameter allows the authorization endorsing device 502 to access an account associated with the user without having the device 502 provide the user's set of credentials. The access continuation parameter can be used when a user changes their credentials to generate new tokens (e.g., changes their password on an account that is associated with one or more of the user's devices). In one embodiment, an access continuation parameter and token is described in U.S. Patent Publication No. 2016/0359863, entitled "Account Access Recovery System, Method and Apparatus," filed Sep. 30, 2015, which is incorporated by reference.

In a further embodiment, the authorization process 510 negotiates an authorization token and returns this authorization token to the HTTP request process 508. The HTTP request process 508 returns the authorization token to the application 504, where the application 504 uses authorization token to authorize the application 504 for the user.

Figure 6:
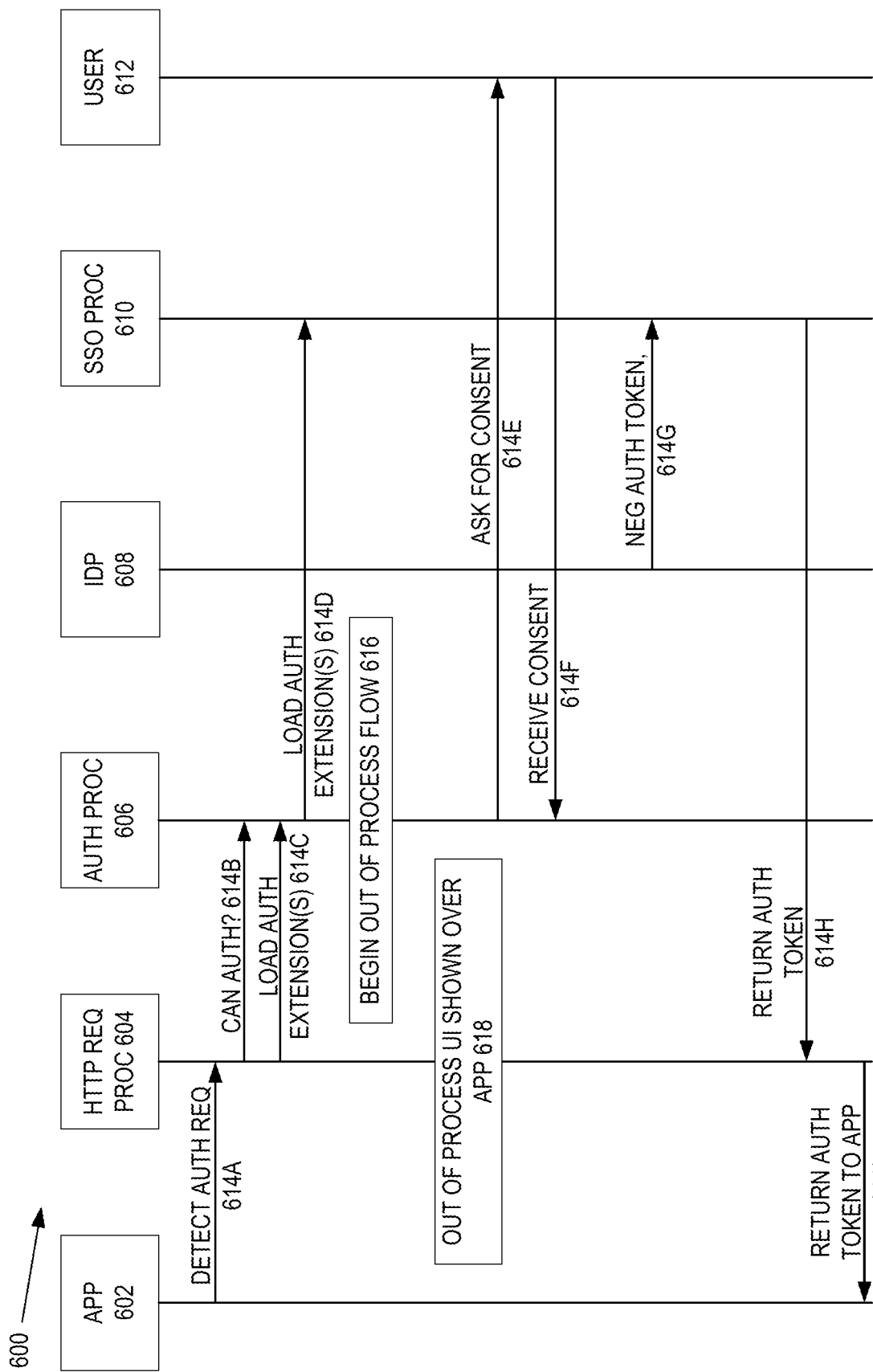
FIG. 6 is an illustration of one embodiment of a flow to handle an application single sign for an application using an interception of an authorization request.

FIG. 6 is an illustration of one embodiment of a flow to handle an application single sign for an application using an interception of an authorization request. In FIG. 6, the flow 600 begins by a HTTP request process 604 detecting an authorization request (614A) from an application 602. In addition, the HTTP request process 604 checks the authorization request to determine if an authorization is needed (614B) for the application 602. In one embodiment, the HTTP request process 604 determines whether the application needs authorization by using a cache that is on the device, where the cache includes a list of domains that require authorization as described in FIG. 5 above. If the HTTP request process 604 detects that the application is part of one of the domains needing authorization, the HTTP request process 604 sends a request to the authorization request process 606 to load the corresponding authorization extensions (614C), where the authorization process 606 relays the request to SSO process 610. In one embodiment, the HTTP request process 604 loads the authorization extensions as described in FIG. 5 above.

After the loading of the authorization extensions, the flow 600 begins the out of process flow 616. In one embodiment, the authorization consent is an out of process flow, where these actions (614E-614I) are performed by a process that is a different process than the process for the HTTP requesting process 604 or a child of the HTTP requesting process 604. In response to the loading of the authorization extensions, the authorization process 606 asks for an authorization consent (614E) to the user of the device. In one embodiment, the authorization consent is an out of process flow, where these actions (614E-614I) are performed by a process that is a different process than the process for the application 602. In one embodiment, the authorization process 606 asks for the authorization consent by presenting an authorization user interface on the device. In response, the authorization process 606 receives user consent (614F) by the user 612 entering the user credentials via the authorization user interface, where the user credentials can be a face identifier, touch identifier, pincode, and/or another type of user credential. In one embodiment, the authorization process 606 presents the authorization user interface and receives the user consent as described in FIG. 5 above. In this embodiment, by asking for and receiving consent by the user, the authorization process 606 is performing a local authentication to authenticate the user as part of the authorization for the application 602.

In a further embodiment, with the local authentication performed by the authorization process 606, the SSO process 610 negotiates an authorization token (614G) with the identity provider 608. In one embodiment, the server authorization request includes the access continuation parameter and the URL. In this embodiment, the server authorization request is used to check that the access continuation parameter is still valid, to generate a token that is used by the website for authorization, and that the application is allowed for this operation (e.g. associated with a valid registered developer for this application). If the authorization is successful, the identity provider 608 returns an authorization token (614H) to the SSO process 610. In one embodiment, the authorization token includes an access continuation parameter and a token. In one embodiment, the SSO process 610 returns an authorization response (614H) to the HTTP request process 604 as described in FIG. 5 above. The HTTP process 604 returns the authorization token to the application 602, so the application 602 can use the authorization token for authorization.

Figure 7:
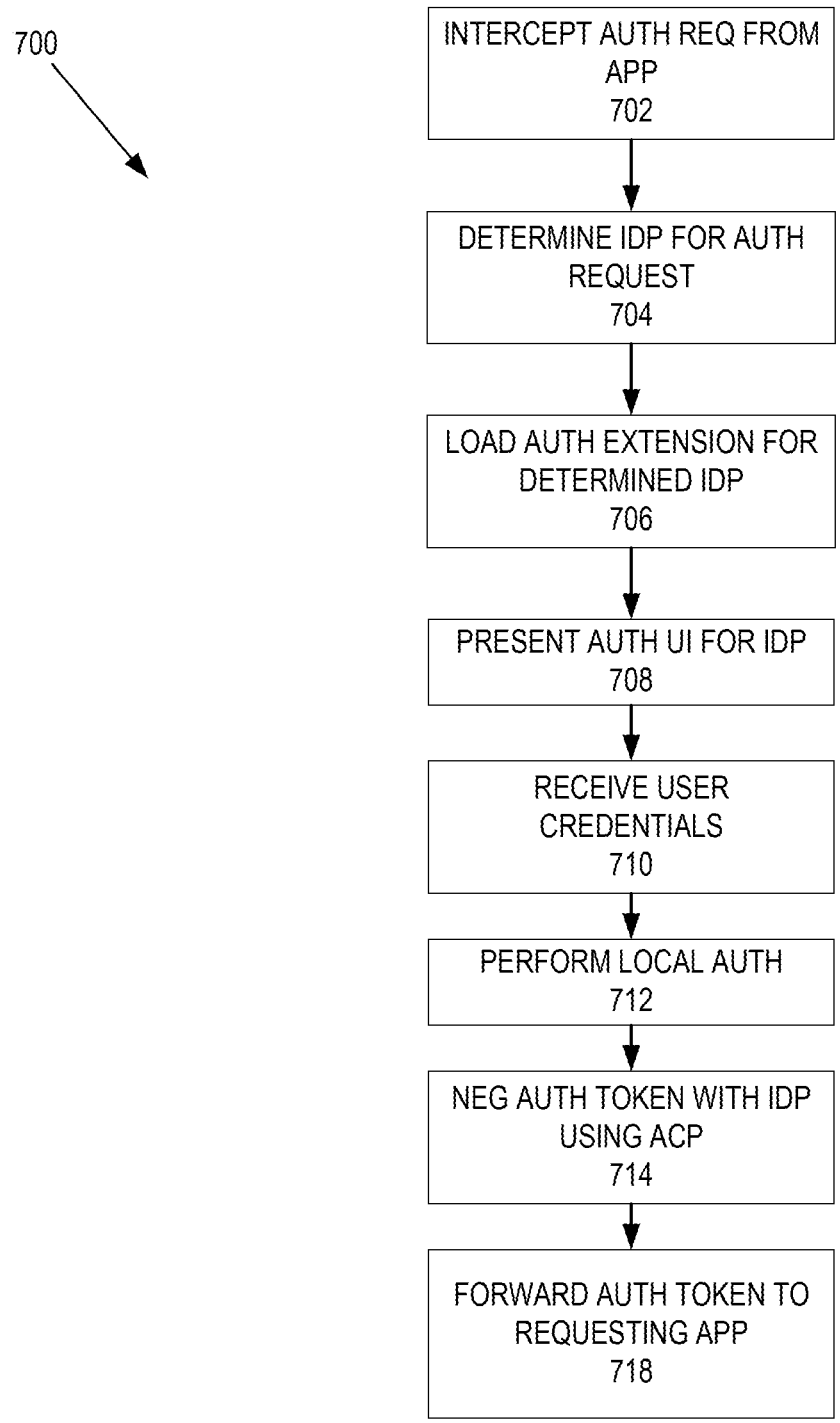
FIG. 7 is a flow diagram of one embodiment of a process to handle an application single sign for an application using an interception of an authorization request.

FIG. 7 is a flow diagram of one embodiment of a process 700 to handle an application single sign for an application using an interception of an authorization request. In one embodiment, a device performs an application sign on via interception, such as the device 502 as described in FIG. 5 above. In FIG. 7, process 700 begins by intercepting an authorization request from an application. In one embodiment, process 700 receives a HTTP request that includes an authorization request. In this embodiment, process 700 checks an on-device cache includes a list of domains that require authorization. If the authorization request includes a domain that requires authorization and the user has not signed in yet, process 700 determines an identity provider at block 704. In one embodiment, process 700 requests a list of identity providers from a server and receives the list. Process 700 then selects one of the identity providers for the authorization request. In one embodiment, the server is an MDM server as described in FIG. 5 above. In one embodiment, process 700 selects the identity providers based on the domain associated with the authorization request.

At block 706, process 700 loads an authorization extension associated with the determined identity provider. In one embodiment, the authorization process sends a request to the SSO process to load the authorization extensions for this HTTP request and the authorization process receives the authorization extension and uses this extension to load an authorization user interface on the device. With the authorization extensions loaded, at block 708, process 700 presents the authorization user interface to the user. In one embodiment, process 700 presents the user authorization request to a user using an authorization user interface as requested in FIG. 5 above. Process 700 receives the user credentials, where the user credentials can be a face identifier, touch identifier, pincode, and/or another type of user credentials, at block 710. With the user credentials, at block 712, process 700 performs a local authentication. In one embodiment, process 700 performs the local authentication using the authentication components that are part of the authorization process 510 and the secure hardware 522 of the device 502 as described in FIG. 5 above. If the local authentication is successful, process 700 negotiates an authorization token with the identity provider at block 714. In one embodiment, the server authorization request includes the access continuation parameter and an application identifier. In this embodiment, the server authorization request is used to check that the access continuation parameter is still valid, to generate a token that is used by the application for authorization, and that the application is allowed for this operation (e.g. associated with a valid registered developer for this application). In one embodiment, process 700 sends a SRP request to the identity provider, where this request is used to identify the user and device that sent the server request to the identity provider and to authorize the application for the user. For example and in one embodiment, process sends the server authorization request as described in FIG. 5 above. In addition, process 700 receives the authorization token from the identity provider. Process 700 further forwards authorization token to the requesting application. In one embodiment, the application uses the authorization token to authorization the use of the application. In one embodiment, this sequence may establish the anonymous user identifier for use with the web site or domain associated with the application. For a subsequent request, the anonymous identity token and authorization code are stored in an application authorization cache on the authorization requesting device and the single sign on (or another type of sign on for the application) is not needed until the user signs out of the application.

Figure 8A:
FIGS. 8A-D are illustrations of embodiments of a user interface for an application single sign for an application.
Figure 8B:
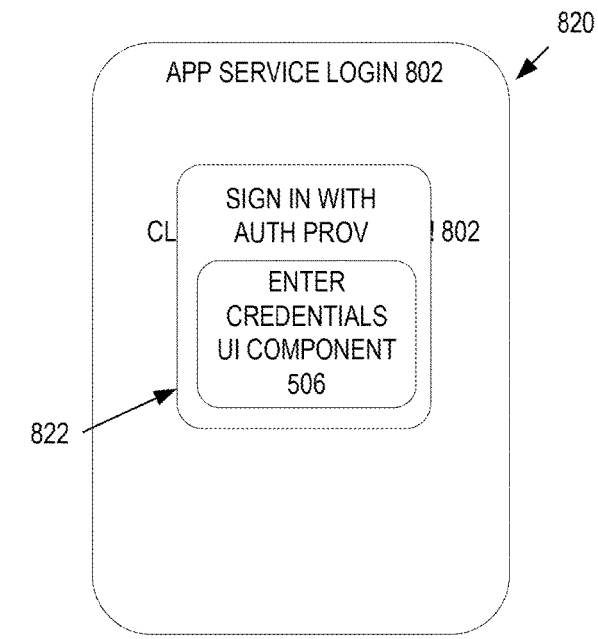
Figure 8C:
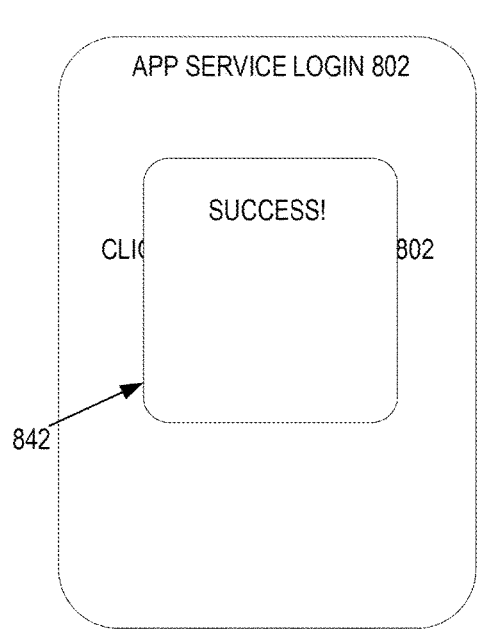
Figure 8D:
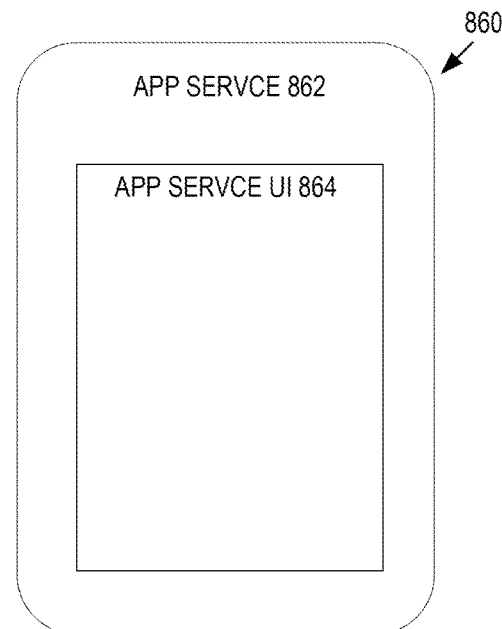

FIGS. 8A-D are illustrations of embodiments of a user interface for an application single sign for an application. In FIG. 8A, an application 800 presents an application service login 802, which includes a hyperlink that indicates to click here to sign in. If a user clicks on this link 804, the device intercepts the request and presents an intercepted user interface on the application 820 as illustrated in FIG. 8B. In FIG. 8B, the application 820 has the overlaid authorization user interface 822 overlaid on the application 820, where the overlaid authorization user interface 822 includes text that states "SIGN IN WITH AUTH PROV" and includes a user interface component that allows the user to enter the user credentials 824. If the user's entered credentials are successful for authorization, a message indicating success may be presented, as illustrated in FIG. 8C. In FIG. 8C, a "SUCCESS" message 842 is presented on the application 840. With the successful authorization, the application 860 presents the application service user interface 862.

Figure 9:
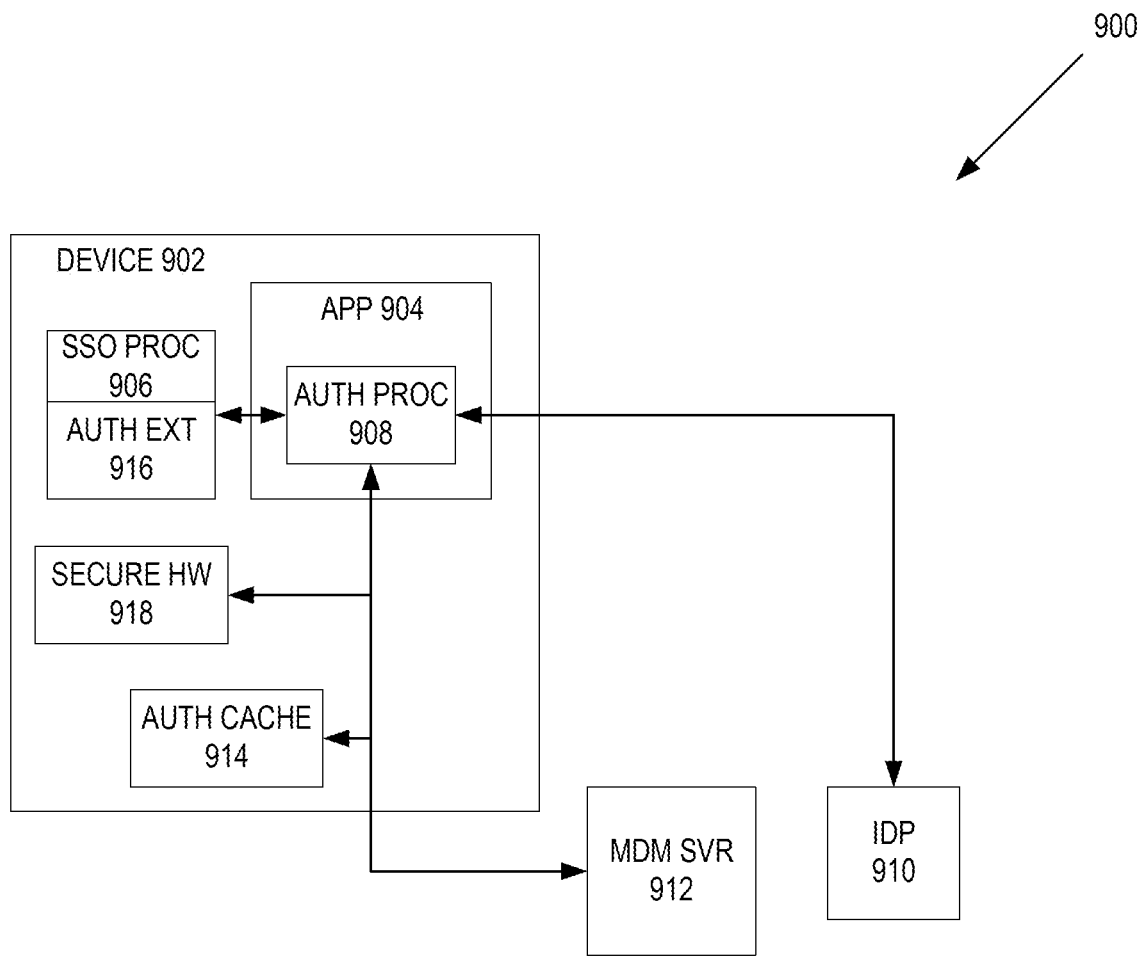
FIG. 9 is an illustration of one embodiment of a system that handles an application single sign for an application using an authorization process.

As described above, FIGS. 5-8D, and in one embodiment, an application authorization is intercepted by an HTTP process. This can be used to perform a single sign on for an application without making any changes to that application. In another embodiment, the application can make the authorization requests natively. FIG. 9 is an illustration of one embodiment of a system 900 that handles an application single sign for an application using an authorization process. In FIG. 9, system 900 includes an application 904 that is coupled to an identity provider 910 and a MDM server 912. In one embodiment, the device 902 is a device that executes an application, such as the device 102 as described in FIG. 1. In addition, the identity provider 910 is the identity provider 116 as described in FIG. 1 above. Furthermore, the MDM server 912 is a server providing an MDM service as described in FIG. 5 above.

In one embodiment, the device 902 includes an application 904 and a SSO process 906. In addition, the application 904 includes an authorization process 908. In one embodiment, the application 904 is software, that when executed by the device 902, provides a function. The authorization process 908 is the process that the application 904 invokes when the application 904 needs to authorize a function of the application 904. In addition, the authorization process 908 is coupled to the SSO process 906.

In a further embodiment, the application 904 invokes the authorization process 908 to authorize the application for use. In one embodiment, the authorization process 908 checks an authorization cache 914 to determine if the application 904 has been authorized. In this embodiment, the authorization cache 914 includes information regarding which applications need authorization and/or if the application has been authorized previously. Furthermore, the authorization cache 914 can include one or more authorization tokens for the applications that have been previously been authorized. In one embodiment, by using an authorization cache 914 that is local to device 902, which applications a user launches or uses to is kept local to the device, because these checks are done locally and not on a remote server.

If the application 904 has not been authorized, the authorization process 908 sends a request to the SSO process to load the authorization extensions 916 for this application 904. In one embodiment, the application 904 is associated with a particular identity provider, such as the identity provider 910. For example and in one embodiment, if an application is for a streaming media service, the corresponding identity provider can be one that supports this streaming media service. The identity provider can be one that verifies an identity for a wide variety services and/or applications (e.g., a large media company, technology provider, etc.) or a specialized identity provider that verifies identities for a narrow group of applications and/or services (e.g., a corporation, government, educational organization, etc.). In response, the authorization process 908 receives the authorization extensions and uses these extensions to load an authorization user interface on the device 902. In one embodiment, the authorization user interface is handled by the authorization process 908 and is part of the process for the application 904. In one embodiment, the authorization user interface is laid over the application user interface. One embodiment of the authorization user interface is discussed in FIGS. 8A-D below.

In one embodiment, the authorization user interface requests the user to sign-on for the application. In response to the authorization user interface being presented on the authorization process 908, the user enters the credentials. With the received user credentials, the authorization process 908 can perform a local authentication using the authentication components that are part of the authorization process 908 and the secure hardware 918. In one embodiment, by performing the local authentication, the authorization process 908 is determining that the user interacting with the authorization process 908 is known to the device 902. In one embodiment, the authorization requesting device 902 does not require a two-factor authentication because the authorization requesting device 902 is a trusted device with a valid access continuation parameter.

If the authorization process 908 is successful with the local authentication, the authorization process 908 sends a server authorization request to the identity provider 910. In one embodiment, the server authorization is used to authenticate the user and to authorize the device 902 for the application. In this embodiment, the authorization process 908 sends a secure remote protocol (SRP) request to the identity provider 910 with the user credentials. In response to receiving the SRP request, the identity provider 910 authenticates the user using the received credentials and receives an authorization response includes an authorization code and a token. In one embodiment, the device 902 is trusted based on a two-factor authentication for the device. As a result of the two-factor authentication, the device 902 receives an access continuation parameter, which can be used in the SRP request to the identify provider 910. In one embodiment, the access continuation parameter allows the device 902 to access an account associated with the user without having the device 902 provide the user's set of credentials. The access continuation parameter can be used when a user changes their credentials to generate new tokens (e.g., changes their password on an account that is associated with one or more of the user's devices). In one embodiment, an access continuation parameter and token is described in U.S. Patent Publication No. 2016/0359863, entitled "Account Access Recovery System, Method and Apparatus," filed Sep. 30, 2015, which is incorporated by reference.

In a further embodiment, the SSO process 906 negotiates an authorization token and returns this authorization token to the authorization process 908. The authorization process 908 returns the authorization token to the application 904, where the application 904 uses authorization token to authorize the application 904 for the user.

Figure 10:
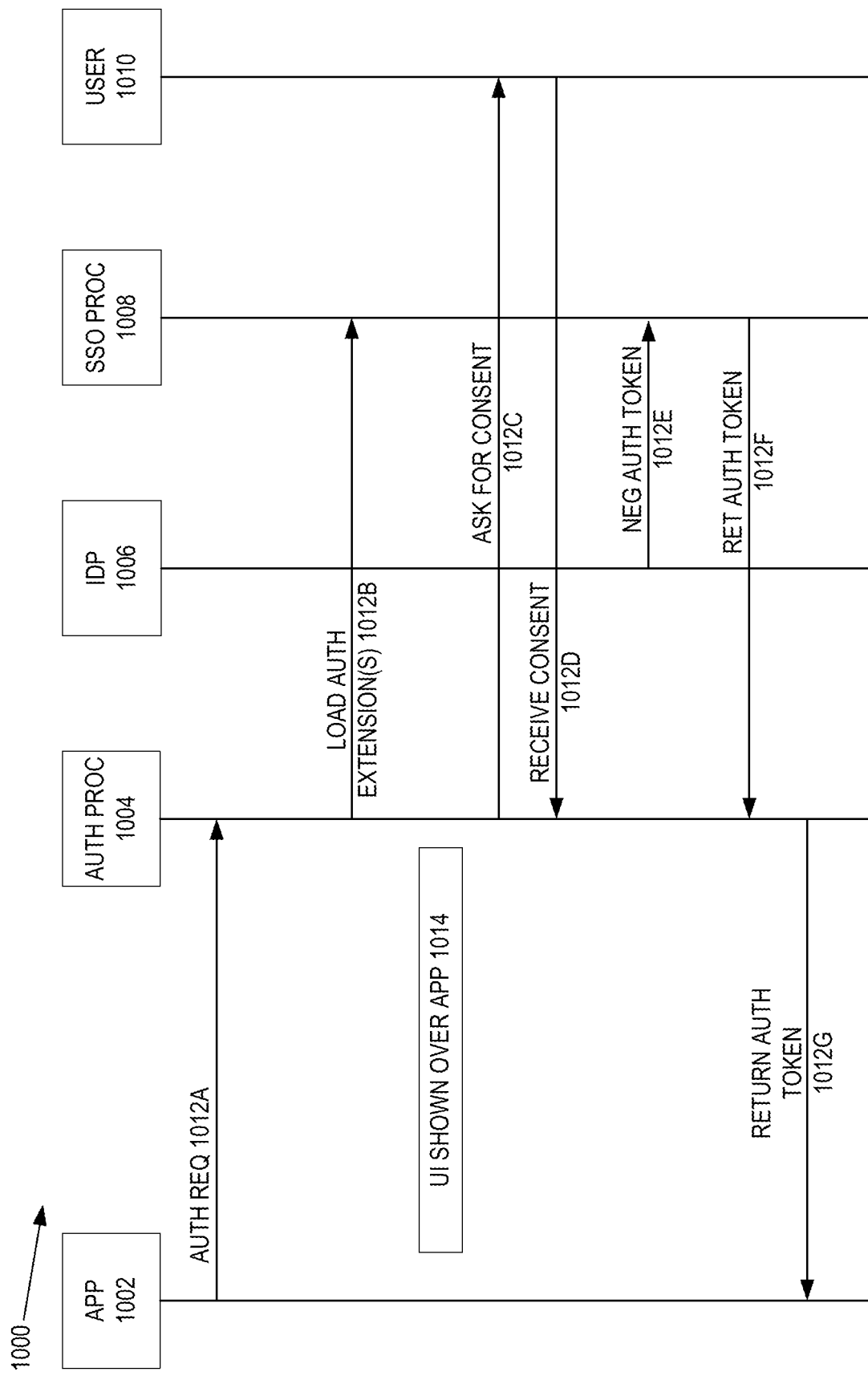
FIG. 10 is an illustration of one embodiment of a flow to handle an application single sign for an application using an authorization process.

FIG. 10 is an illustration of one embodiment of a flow to handle an application single sign for an application using an authorization process. In FIG. 10, the flow 1000 begins by an authorization process 1004 receiving an authorization request (1012A) from an application 1002. In addition, the authorization process 1004 checks the authorization request 1012A to determine if an authorization is needed for the application 1002. In one embodiment, the authorization process 1004 determines whether the application needs authorization by using a cache that is on the device, where the cache includes a list of domains that require authorization. If the authorization process 1004 detects that the application is part of one of the domains needing authorization, the authorization process 1004 sends a request to the SSO process 1006 to load the corresponding authorization extensions (1012B), where the authorization process 1004 relays the request to SSO process 1010. In one embodiment, the authorization process 1004 loads the authorization extensions as described in FIG. 9 above.

In response to the loading of the authorization extensions, the authorization process 1004 asks for an authorization consent (1012C) to the user of the device. In one embodiment, the authorization process 1004 asks for the authorization consent by presenting an authorization user interface on the device. In response, the authorization process 1004 receives user consent (1012D) by the user 1010 entering the user credentials via the authorization user interface, where the user credentials can be a face identifier, touch identifier, pincode, and/or another type of user credentials. In one embodiment, the authorization process 1004 presents the authorization user interface and receives the user consent as described in FIG. 9 above. In this embodiment, by asking for and receiving consent by the user, the authorization process 1004 is performing a local authentication to authenticate the user as part of the authorization for the application 1002.

In a further embodiment, with the local authentication performed by the authorization process 1004, the authorization process 1004 negotiates an authorization token with the identity provider 1006. In one embodiment, the server authorization request includes the access continuation parameter and the URL. In this embodiment, the server authorization request is used to check that the access continuation parameter is still valid, to generate a token that is used by the website for authorization, and that the application is allowed for this operation (e.g. associated with a valid registered developer for this application). If the authorization is successful, the identity provider 1006 returns an authorization token (1012F) to the authorization process 1004. In one embodiment, the authorization token includes an access continuation parameter and a token. In one embodiment, the authorization process 1004 returns the authorization token (1012G) to the authorization process 1004 as described in FIG. 9 above. The authorization process 1004 returns the authorization token to the application 1002, so the application 1002 can use the authorization token for authorization.

Figure 11:
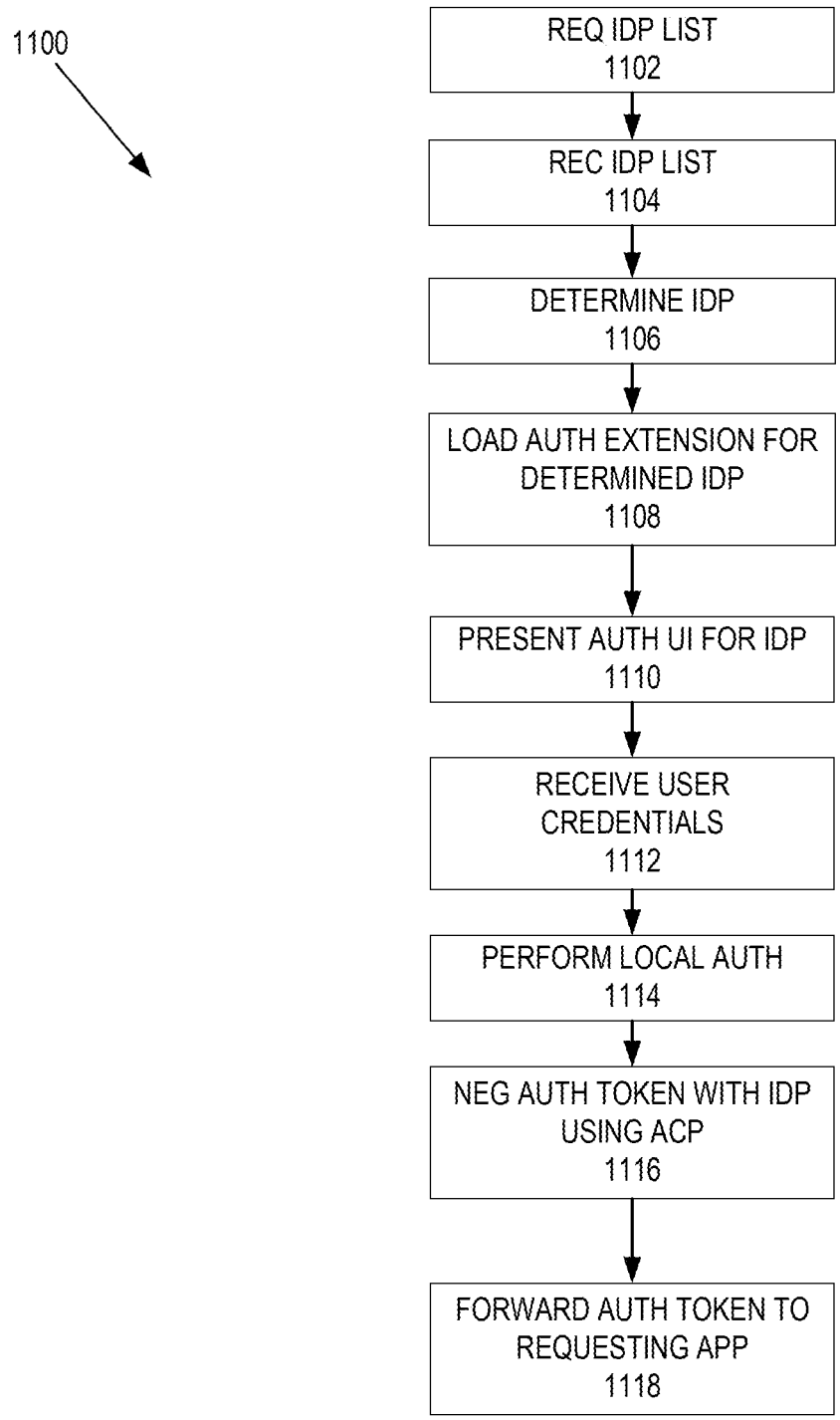
FIG. 11 is a flow diagram of one embodiment of a process to handle an application single sign for an application using an authorization process.

FIG. 11 is a flow diagram of one embodiment of a process to handle an application single sign for an application using an authorization process. In one embodiment, a device performs an application sign on, such as the device 902 as described in FIG. 9 above. In FIG. 11, process 1100 begins by requesting list of identity providers at block 1102. In one embodiment, process 1100 request the list of identity providers from a MDM server as described in FIG. 9 above. At block 1104, process 1100 receives the list of identity providers. Process 1100 determines the identity provider at block 1106. In one embodiment, which identity providers process 1100 depends on the application that is requesting the authorization.

At block 1108, process 1100 loads an authorization extension associated with the determined identity provider. In one embodiment, the authorization process sends a request to the SSO process to load the authorization extensions for this application, the authorization process receives the authorization extension and uses this extension to load an authorization user interface on the device. With the authorization extensions loaded, at block 1110, process 1100 presents the authorization user interface to the user. In one embodiment, process 1100 presents the user authorization request to a user using an authorization user interface as requested in FIG. 9 above. Process 1100 receives the user credentials, where the user credentials can be a face identifier, touch identifier, pincode, and/or another type of user credentials, at block 1112. With the user credentials, at block 1114, process 1100 performs a local authentication. In one embodiment, process 1100 performs the local authentication using the authentication components that are part of the authorization process 908 and the secure hardware 918 of the device 902 as described in FIG. 9 above. If the local authentication is successful, process 1100 negotiates an authorization token with the identity provider at block 1116. In one embodiment, the server authorization request includes the access continuation parameter and an application identifier. In this embodiment, the server authorization request is used to check that the access continuation parameter is still valid, to generate a token that is used by the application for authorization, and that the application is allowed for this operation (e.g. associated with a valid registered developer for this application). In one embodiment, process 1100 sends a SRP request to the identity provider, where this request is used to identify the user and device that sent the server request to the identity provider and to authorize the application for the user. For example and in one embodiment, process sends the server authorization request as described in FIG. 9 above. In addition, process 1100 receives the authorization token from the identity provider. Process 1100 further forwards authorization token to the requesting application. In one embodiment, the application uses the authorization token to authorization the use of the application. In one embodiment, this sequence may establish the anonymous user identifier for use with the web site or domain associated with the application. For a subsequent request, the anonymous identity token and authorization code are stored in an application authorization cache on the authorization requesting device and the single sign on (or another type of sign on for the application) is not needed until the user signs out of the application.

Figure 12:
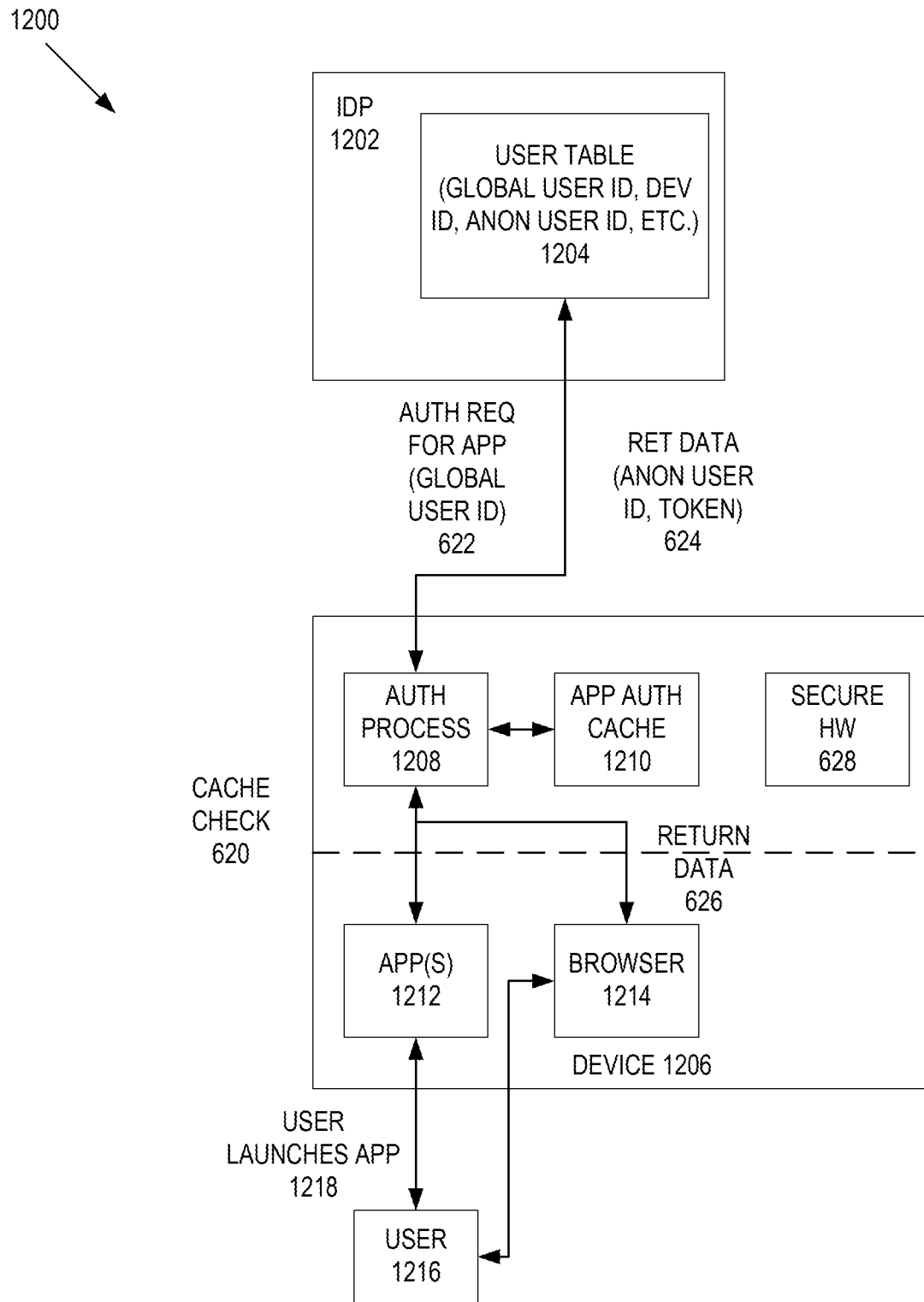
FIG. 12 is an illustration of one embodiment of a system for caching the application information.

FIG. 12 is an illustration of one embodiment of a system 1200 for caching the application information. In FIG. 12, the device 1206 is coupled to an identity provider 1202. In one embodiment, the identity provider 1202 is the identity provider 1202 that is described in FIG. 1 above. Furthermore, device 1206 can be the authorization requesting device 102 as described in FIG. 1 above. In addition, device 1206 is trusted by the identity provider 1202 because of an established trust relationship between the device 1206 and the identity provider 1202 that was established by two-factor authentication. In this embodiment, the device 1206 can be any type of device that can execute an application (e.g., smart phone, laptop, personal computer, digital media device, television, server, tablet, wearable, vehicle component, and/or any type of device that can process instructions of an application). The device 1206 further includes one or more applications 1212, a browser 1214, an authorization process 1208, an application authorization cache 1210, and secure hardware 628. In one embodiment, the one or more applications 1212 are each an embodiment of software that runs on the device 1206 and can perform a variety of functions. Furthermore, in this embodiment, the browser 1214 can be a web browser that can make and receive requests for data over a network coupled to device 1206. In this embodiment, the authorization process 1208 is a process that is not a process or a child process for either the application(s) 1212 or the browser 1214.

The device 1206 additionally includes an authorization process 1208 that communicates with the identity provider 1202 for the one or more applications 1212 or the browser 1214. In particular, the authorization process 1208 determines if the user 1216 is authorized for the one or more applications 1212 or the browser 1214 using the application authorization cache 1210 and/or the identity provider 1202. In one embodiment, the user launches (1218) an application 1212. The authorization process 1208 detects the launch of the application 1212 and checks (620) the application authorization cache 1210 to determine if the user 1216 had previously signed on with the application 1212 via the identity provider 1202. If the application 1212 is in the application authorization cache 1210, the application 1212 continues to launch, where the application 1212 is configured for use with the private relay and the anonymous user email address.

If the application 1212 is not in the application authorization cache 1210, the authorization process 1208 sends an authorization request (622) for the application 1212. In one embodiment, the authorization request (622) includes data that is used for the request, such as the global user identifier, developer identifier for the application 1212, one or more tokens generated on the device 1206, and/or other information used for the authorization request. The identity provider 1202 includes a user table that associates the global user identifier, developer identifier, anonymous user identifier, and/or other information used by the identity provider 1202 for that combination of user and developer. In this embodiment, the developer identifier for an application is generated when a developer associated with one of the applications 1212 registers that application 1212 with the identity provider 1202. Furthermore, the anonymous user identifier is generated when the user signs-on for an application, where the anonymous user identifier is tied to the global user identifier and the developer identifier.

In response to receiving the authorization request, the identity provider 1202 returns the local data (e.g., anonymous user identifier, application token, and/or other information used by the authorization process on the device) (626) to the authorization process 1208 of the device 1206. In one embodiment, some or all of the local data can be stored in the application authorization cache 1210. The authorization process 1208, in turn, returns this data to the application 1212. In one embodiment, the identity provider 1202 refreshes the application authorization cache 1210 for each time period (e.g., every 24 hours), on demand from the application, request from a user, pushed out based on user activity on other devices (e.g., a user signs on or off on a different device), a dynamic schedule, and/or another type of schedule. In a further embodiment, if a user 1216 explicitly signs out of the application 1212 on one device, the identity provider 1202 detects this sign out and pushes out the sign out to other devices of the user 1216. For example and in one embodiment, if the user 1216 signs out of an application 1212 on a smartphone, the identity provider 1202 pushes out a sign out for this application 1212 on the other user 1216 devices (e.g., the user's tablet or laptop). Alternatively, if the user 1216 signs into an application on one device, this sign on information is pushed out to the user's other devices.

As described above, in FIG. 12, the device 1206 sends an authorization request for an application to the identity provider 1202 if the authorization information for the application 1212 is not stored in application authorization cache 1210. In one embodiment, by using the application authorization cache 1210, the device 1206 can shield the user's private information from the developer by use of a local cache (e.g., the application authorization cache 1210). This is because the identity management server does not track user sign-ons to or launches of the application 1212. In one embodiment, the device 1206 further includes secure hardware 1228. In this embodiment, the secure hardware 1228 is used to for local authentication of the user 1216 for the device 1206 (e.g. via pincode, biometric credentials, and/or other types of authentication data).

Figure 13:
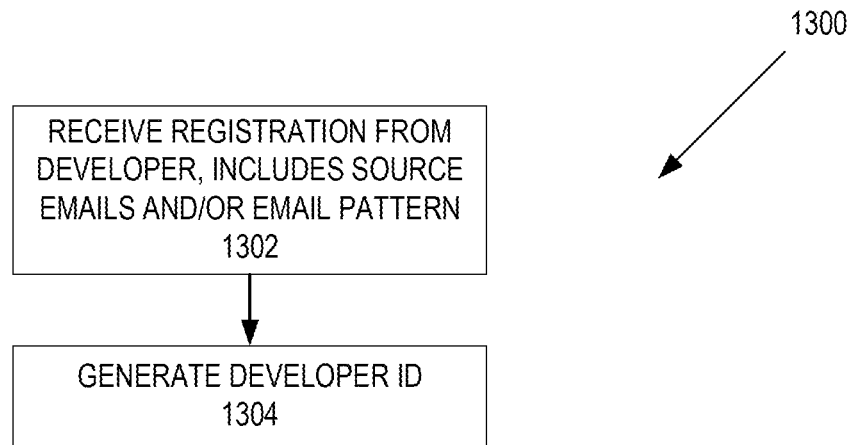
FIG. 13 is a flow diagram of one embodiment of a process to register a developer.

FIG. 13 is a flow diagram of one embodiment of a process 1300 to register a developer. In FIG. 13, process 1300 begins by receiving a registration from the developer that includes information regarding developer source email addresses and/or allowed email patterns at block 1302. In one embodiment, the developer registration information includes an application URL that is a URL of the base application of the developer, which proves domain ownership. Furthermore, the registration information can include a URL that is used to redirect the web process after the authorization is complete. This redirect URL can be returned to the authorization requesting device after a successful authorization. In one embodiment, each developer has an associated identifier that is used in the sign-on processes, such as the single sign process on described above. At block 1304, process 1300 generates the developer identifier that can be used with a user sign-in to create a long-lived for one of the developer's applications.

Figure 14:
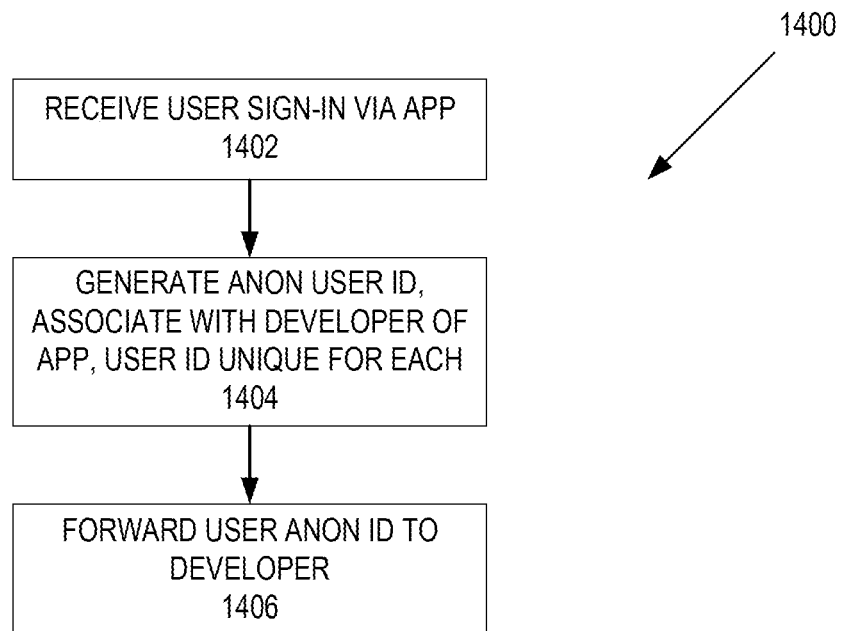

FIG. 14 is a flow diagram of one embodiment of a process to handle a user sign on for an application. In FIG. 14, process 1400 begins by receiving an indication of user sign in via the application at block 1402. In one embodiment, the user sign in can include the user's global user identifier or another identifier tied to global user identifier (e.g., a secondary email address for the user). Alternatively, the user can permit access to a password management system to allow the use of the user's password for the global user identifier without the user having to enter tis password. At block 1404, process 1400 generates the anonymous user identifier and associates this identifier with the developer identifier of the application. In one embodiment, the anonymous user identifier is associated with a developer identifier and is unique within the authorization domain of the identity provider. In a further embodiment, the anonymous user identifier and the developer identifier are stored in a table along with other information for this relationship (e.g., anonymized user email address, the user's real email address, what private information to share, and other information used to maintain this association). Process 1400 additionally forwards the user anonymous identifier, the anonymized user email address, and possible non-private user information to the developer at block 1406.

In one embodiment, the developer can use the anonymous user identifier to track the actions of the user within the application of the developer that the user has performed a sign-on. In this embodiment, when the user signs on with the application, the developer can track the actions the user performed with the application (e.g., ordered merchandise, streamed media, browsing with the application, and/or other types of actions with the developer's application). Thus, the developer can use the anonymized user email address and the tracked information about the user to send targeted email to the user. In one embodiment, however, because the application authorization cache is stored on the device and not on a remote server, the developer cannot retrieve information on how the user uses applications that are not associated with the developer. In this embodiment, the user's application usage that is outside of the developer is shielded from the developer.

Figure 15:
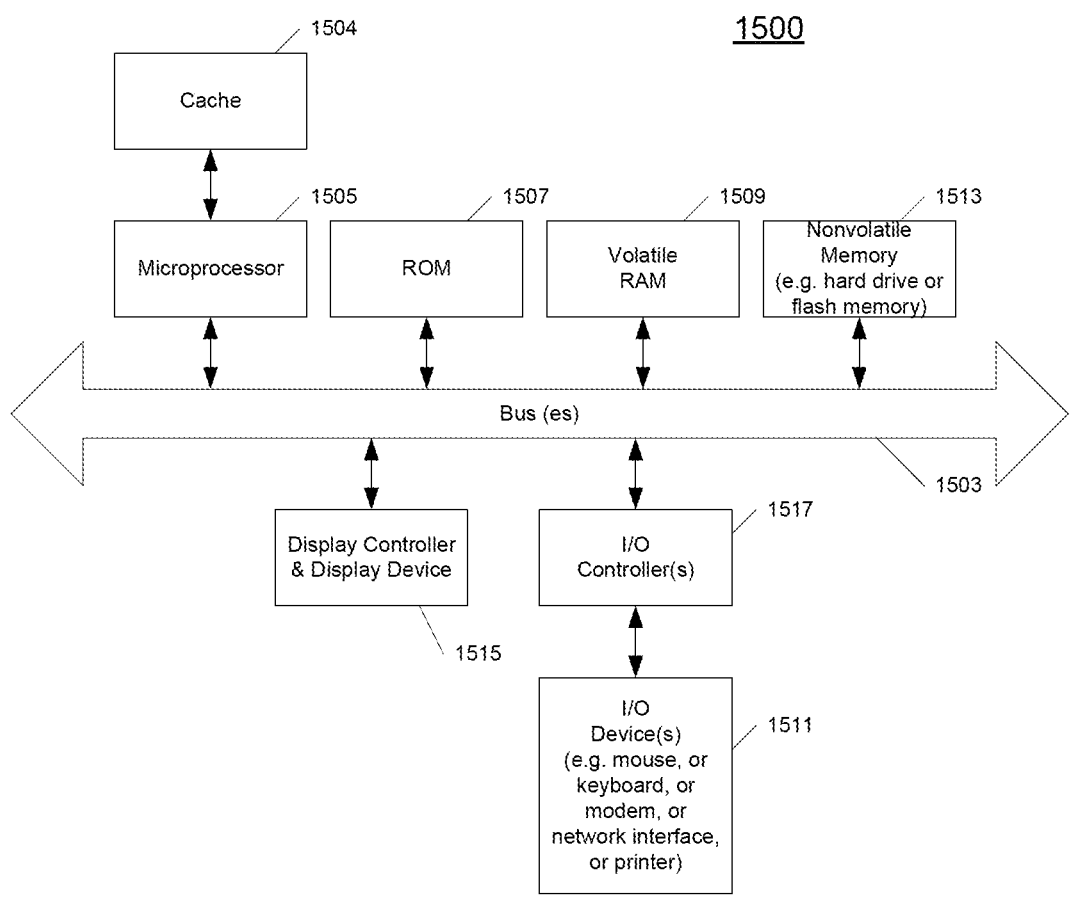
FIG. 15 illustrates one example of a typical computer system, which may be used in conjunction with the embodiments described herein.

FIG. 15 shows one example of a data processing system 1500, which may be used with one embodiment of the present invention. For example, the system 1500 may be implemented as a system that includes an authorization requesting device 102 as illustrated in FIG. 1 above, device 502 as illustrated in FIG. 5, and/or device 902 as illustrated in FIG. 9. Note that while FIG. 15 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 15, the computer system 1500, which is a form of a data processing system, includes a bus 1503 which is coupled to a microprocessor(s) 1505 and a ROM (Read Only Memory) 1507 and volatile RAM 1509 and a non-volatile memory 1511. The microprocessor 1505 may include one or more CPU(s), GPU(s), a specialized processor, and/or a combination thereof. The microprocessor 1505 may retrieve the instructions from the memories 1507, 1509, 1511 and execute the instructions to perform operations described above. The bus 1503 interconnects these various components together and also interconnects these components 1505, 1507, 1509, and 1511 to a display controller and display device 1519 and to peripheral devices such as input/output (I/O) devices which may be mice, keyboards, modems, network interfaces, printers and other devices which are well known in the art. Typically, a display controller and display device 1515 is coupled to the system through input/output controllers 1513. The volatile RAM (Random Access Memory) 1509 is typically implemented as dynamic RAM (DRAM), which requires power continually in order to refresh or maintain the data in the memory.

The non-volatile memory 1511 is typically a magnetic hard drive or a magnetic optical drive or an optical drive or a DVD RAM or a flash memory or other types of memory systems, which maintain data (e.g. large amounts of data) even after power is removed from the system. Typically, the non-volatile memory 1511 will also be a random access memory although this is not required. While FIG. 15 shows that the non-volatile memory 1511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1503 may include one or more buses connected to each other through various bridges, controllers and/or adapters as is well known in the art.

Figure 16:
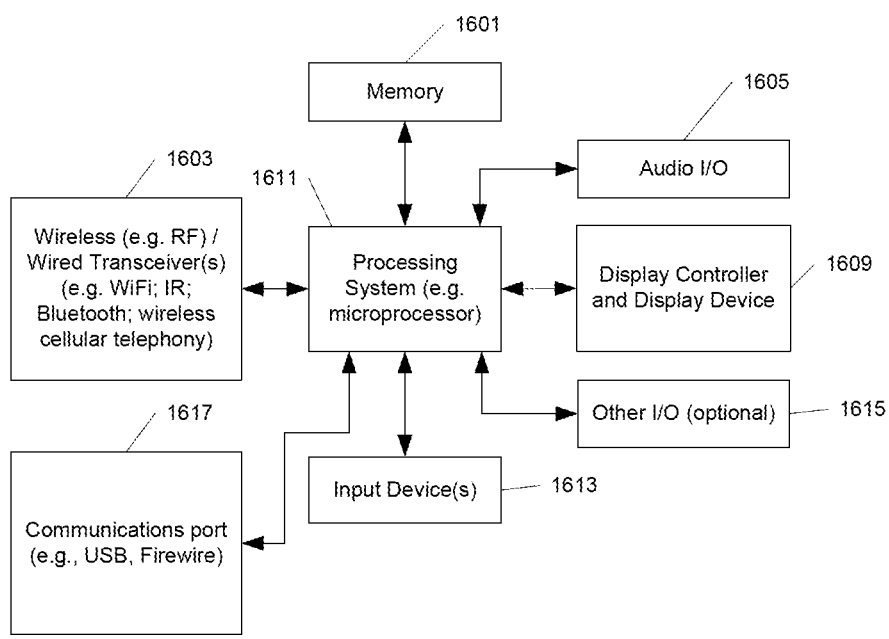
FIG. 16 shows an example of a data processing system, which may be used with one embodiment of the present invention.

FIG. 16 shows an example of another data processing system 1600 which may be used with one embodiment of the present invention. For example, system 1600 may be implemented as an authorization requesting device 102 as shown in FIG. 1 above. The data processing system 1600 shown in FIG. 16 includes a processing system 1611, which may be one or more microprocessors, or which may be a system on a chip integrated circuit, and the system also includes memory 1601 for storing data and programs for execution by the processing system. The system 1600 also includes an audio input/output subsystem 1605, which may include a microphone and a speaker for, for example, playing back music or providing telephone functionality through the speaker and microphone.

A display controller and display device 1609 provide a visual user interface for the user; this digital interface may include a graphical user interface which is similar to that shown on a Macintosh computer when running OS X operating system software, or Apple iPhone when running the iOS operating system, etc. The system 1600 also includes one or more wireless transceivers 1603 to communicate with another data processing system, such as the system 1600 of FIG. 16. A wireless transceiver may be a WLAN transceiver, an infrared transceiver, a Bluetooth transceiver, and/or a wireless cellular telephony transceiver. It will be appreciated that additional components, not shown, may also be part of the system 1600 in certain embodiments, and in certain embodiments fewer components than shown in FIG. 16 may also be used in a data processing system. The system 1600 further includes one or more communications ports 1617 to communicate with another data processing system, such as the system 1500 of FIG. 15. The communications port may be a USB port, Firewire port, Bluetooth interface, etc.

The data processing system 1600 also includes one or more input devices 1613, which are provided to allow a user to provide input to the system. These input devices may be a keypad or a keyboard or a touch panel or a multi touch panel. The data processing system 1600 also includes an optional input/output device 1615 which may be a connector for a dock. It will be appreciated that one or more buses, not shown, may be used to interconnect the various components as is well known in the art. The data processing system shown in FIG. 16 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1600 may be a network computer or an embedded processing device within another device, or other types of data processing systems, which have fewer components or perhaps more components than that shown in FIG. 16.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, CA, a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "determining," "presenting," "redirecting," "communicating," "intercepting," "sending," "receiving," "loading," "negotiating," "returning," "selecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to authorize a device for a service provided by an application executing on the device, the method comprises:
    receiving, by the application on the device, an authorization request, the authorization request destined for a service provider server, wherein the service is one of a plurality of services and each of the plurality of services has a different native login mechanism, wherein the authorization request is detected by the device, and wherein the device performs a local authentication using a set of user credentials;
    receiving, through an authorization user interface, user consent for a single sign on service to authorize the application;
    receiving, by the application, an authorization token that authorizes each of the plurality of services as a result of the local authentication and the user consent, the authorization token is used for an authorization server to authorize each of the plurality of services, the authorization token allows the device to access the service without having the device to provide the set of user credentials, the authorization token was negotiated with the authorization server; and
    sending the authorization token to the service provider server.

2. The non-transitory machine-readable medium of claim 1, wherein the local authentication uses the authorization user interface.

3. The non-transitory machine-readable medium of claim 2, wherein the authorization user interface includes a component for receiving the user credentials from the user.

4. The non-transitory machine-readable medium of claim 2, wherein the user credentials are selected from a group consisting of biometric user credentials or a username and password.

5. The non-transitory machine-readable medium of claim 1, wherein an indication that the application can be authorized is included in the authorization request.

6. The non-transitory machine-readable medium of claim 1, further comprising: sending the authorization request to the service provider server.

7. The non-transitory machine-readable medium of claim 1, wherein the local authentication is associated with an identity provider.

8. The non-transitory machine-readable medium of claim 7, wherein the identity provider is selected from a list of identity providers provided by an identity server.

9. The non-transitory machine-readable medium of claim 8, wherein the identity server is a mobile device management server.

10. The non-transitory machine-readable medium of claim 7, wherein the identity provider is a service that verifies an identity.

11. A method to authorize a device for a service provided by an application executing on the device, the method comprises:
    receiving, by the application on the device, an authorization request, the authorization request destined for a service provider server, wherein the service is one of a plurality of services and each of the plurality of services has a different native login mechanism, wherein the authorization request is detected by the device, and wherein the device performs a local authentication using a set of user credentials;
    receiving, through an authorization user interface, user consent for a single sign on service to authorize the application;
    receiving, by the application, an authorization token that authorizes each of the plurality of services as a result of the local authentication and the user consent, the authorization token is used for an authorization server to authorize each of the plurality of services, the authorization token allows the device to access the service without having the device to provide the set of user credentials, the authorization token was negotiated with the authorization server; and
    sending the authorization token to the service provider server.

12. The method of claim 11, wherein the local authentication uses the authorization user interface.

13. The method of claim 12, wherein the authorization user interface includes a component for receiving the user credentials from the user.

14. The method of claim 12, wherein the user credentials are selected from a group consisting of biometric user credentials or a username and password.

15. The method of claim 11, wherein an indication that the application can be authorized is included in the authorization request.

16. The method of claim 11, further comprising:
    sending the authorization request to the service provider server.

17. The method of claim 11, wherein the local authentication is associated with an identity provider.

18. The method of claim 17, wherein the identity provider is selected from a list of identity providers provided by an identity server.

19. The method of claim 18, wherein the identity server is a mobile device management server.

20. The method of claim 17, wherein the identity provider is a service that verifies an identity.

* * * * *